United States Patent
Bengad et al.

(10) Patent No.: US 11,954,318 B2
(45) Date of Patent: Apr. 9, 2024

(54) DYNAMICALLY ADJUSTING GUI ELEMENTS TO REFLECT USER MULTI-SELECTION

(71) Applicant: monday.com Ltd., Tel Aviv (IL)

(72) Inventors: Barak Bengad, Tel Aviv (IL); Eran Huberman, Rehovot (IL); Alon Bar David, Herzliya (IL); Danielle Hassan, Tel-Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 18/091,469

(22) Filed: Dec. 30, 2022

(65) Prior Publication Data

US 2023/0266871 A1 Aug. 24, 2023

Related U.S. Application Data

(60) Provisional application No. 63/312,028, filed on Feb. 20, 2022.

(51) Int. Cl.
*G06F 3/0482* (2013.01)
*G06F 3/04845* (2022.01)
*G06F 3/0486* (2013.01)

(52) U.S. Cl.
CPC ........ *G06F 3/04845* (2013.01); *G06F 3/0482* (2013.01); *G06F 3/0486* (2013.01)

(58) Field of Classification Search
None
See application file for complete search history.

(56) References Cited

U.S. PATENT DOCUMENTS

| | | | | |
|---|---|---|---|---|
| 6,184,876 B1* | 2/2001 | Miller | ............... | G06F 3/167 |
| | | | | 715/978 |
| 7,565,618 B2* | 7/2009 | Sheasby | ............... | G06F 3/0486 |
| | | | | 715/769 |
| 11,556,241 B2* | 1/2023 | Polyulya | ............ | G06F 3/04883 |
| 2005/0154991 A1* | 7/2005 | Jaeger | ................ | G06F 3/0481 |
| | | | | 715/752 |
| 2006/0085756 A1* | 4/2006 | Srivastava | ............ | G06F 3/0481 |
| | | | | 715/770 |
| 2013/0234949 A1* | 9/2013 | Chornenky | ......... | G06F 3/04886 |
| | | | | 345/169 |
| 2014/0122073 A1* | 5/2014 | Goldstein | ............ | G06F 16/60 |
| | | | | 704/235 |
| 2014/0157169 A1* | 6/2014 | Kikin-gil | ............ | G06F 3/04886 |
| | | | | 715/770 |

(Continued)

*Primary Examiner* — Henry Orr

(57) ABSTRACT

A method of adjusting elements of a GUI to reflect multi-selection of GUI items, comprising presenting a plurality of selectable GUI items each characterized by one or more unique attributes and one or more action GUI configured to initiate one or more actions adjusted according to a multi-selection of the selectable GUI items, analyzing user input to detect multiple indications gradually indicated by a user to select a group of selectable GUI items, responsive to detection of each of the indications, appending the unique attribute(s) of the respective selectable GUI item selected in the respective indication to the action GUI element(s) such that the action GUI element(s) is dynamically adjusted to aggregate the unique attribute(s) of all of the selectable GUI items of the group, and responsive to activation of the action GUI element(s), initiate the action(s) adjusted according to all of the selectable GUI items of the group.

22 Claims, 12 Drawing Sheets

(56) References Cited

U.S. PATENT DOCUMENTS

| | | | | |
|---|---|---|---|---|
| 2014/0324943 A1* | 10/2014 | Antipa | ............... | G06F 3/0482 |
| | | | | 709/203 |
| 2015/0207850 A1* | 7/2015 | Jitkoff | ............... | H04W 4/21 |
| | | | | 709/219 |
| 2016/0259526 A1* | 9/2016 | Lee | ............... | H04L 51/04 |
| 2016/0277536 A1* | 9/2016 | Barry | ............... | G06Q 10/10 |
| 2017/0102871 A1* | 4/2017 | Won | ............... | G06F 9/451 |
| 2021/0248983 A1* | 8/2021 | Balassanian | ............... | H04L 9/0643 |
| 2022/0044466 A1* | 2/2022 | Nordberg | ............... | G06T 13/80 |
| 2022/0172419 A1* | 6/2022 | Sachter-Zeltzer | ............... | G06T 13/80 |

\* cited by examiner

222H (C)REATIVE

VISUAL ELEMENT 1

402D1

(P)ROJECT MANAGEMENT

VISUAL ELEMENT 2

402D2

(S)OFTWARE DESIGN

VISUAL ELEMENT 3

402D3

(O)PERATIONS

VISUAL ELEMENT 4

DYNAMICALLY ADJUSTING GUI ELEMENTS TO REFLECT USER MULTI-SELECTION

RELATED APPLICATION(S)

This application claims the benefit of priority under 35 USC § 119(e) of U.S. Provisional Patent Application No. 63/312,028 filed on Feb. 20, 2022, the contents of which are all incorporated by reference as if fully set forth herein in their entirety.

BACKGROUND

The present invention, in some embodiments thereof, relates to adjusting Graphical User Interface (GUI) elements according to user selection, and, more specifically, but not exclusively, to adjusting GUI elements according to user multi-selection of a plurality of selectable GUI items to visually reflect all the selected items.

Application GUI are the most common and fundamental interfaces for user-computer interaction for practically any user oriented application, website, tool and/or the like (collectively designated application). A GUI of an application may typically comprise one or more visual elements presented on the screen of a client device (e.g. server, computer, Smartphone, tablet, Smart watch, wearable device, etc.) through which a user may interact with the application, select items, insert data, and/or the like and get response from the application accordingly.

Due to abundance of different GUIs which may be presented to a user via his client device, it may be difficult to keep the user engaged with a GUI, and thus there is a need in the art for methods for keeping users engaged therewith.

SUMMARY

According to a first aspect of the present invention there is provided a computer implemented method of visually adjusting elements of a Graphical User Interface (GUI) to reflect user selected items, comprising:
  Presenting a plurality of selectable GUI items and one or more action GUI elements configured to initiate one or more actions adjusted according to a multi-selection of at least some of the plurality of selectable GUI items. Each of the plurality of selectable GUI items is characterized by one or more unique attributes.
  Analyzing user input to detect a plurality of indications gradually indicated by a user to select a group of selectable GUI items from the plurality of selectable GUI items.
  Responsive to detection of each of the plurality of indications, appending one or more of the unique attributes of the respective selectable GUI item selected in the respective indication to the one or more action GUI elements such that the one or more action GUI elements are dynamically adjusted to aggregate the one or more unique attributes of all of the selectable GUI items of the group.

According to a second aspect of the present invention there is provided a system for visually adjusting elements of a Graphical User Interface (GUI) to reflect user selected items, comprising one or more processor configured to execute a code. The code comprising:
  Code instructions to present a plurality of selectable GUI items and one or more action GUI elements configured to initiate one or more actions adjusted according to a multi-selection of at least some of the plurality of selectable GUI items. Each of the plurality of selectable GUI items is characterized by one or more unique attributes.
  Code instructions to analyze user input to detect a plurality of indications gradually indicated by a user to select a group of selectable GUI items from the plurality of selectable GUI items.
  Code instructions to append, responsive to detection of each of the plurality of indications, one or more of the unique attributes of the respective selectable GUI item selected in the respective indication to the one or more action GUI elements such that the one or more action GUI elements are dynamically adjusted to aggregate the one or more unique attributes of all of the selectable GUI items of the group.

According to a first aspect of the present invention there is provided a computer implemented method of visually adjusting elements of a Graphical User Interface (GUI) to reflect user selected items, comprising:
  Presenting a plurality of selectable GUI items and one or more action GUI elements configured to initiate one or more actions adjusted according to a multi-selection of at least some of the plurality of selectable GUI items. Each of the plurality of selectable GUI items is characterized by one or more unique attributes.
  Analyzing user input to detect a plurality of indications gradually indicated by a user to select a group of selectable GUI items from the plurality of selectable GUI items.
  Responsive to detection of each of the plurality of indications, appending one or more of the unique attributes of the respective selectable GUI item selected in the respective indication to the one or more action GUI elements such that the one or more action GUI elements are dynamically adjusted to aggregate the one or more unique attributes of all of the selectable GUI items of the group.
  Responsive to activation of the one or more action GUI elements, initiate one or more of the actions adjusted according to all of the selectable GUI items of the group.

In a further implementation form of the first, second, and/or third aspects, responsive to detection of deselection of one or more selectable GUI items of the group, the one or more unique attributes of the one or more deselected selectable GUI items are removed from the one or more action GUI elements.

In a further implementation form of the first, second, and/or third aspects, the one or more action GUI elements are dynamically adjusted to aggregate the one or more unique attributes of all of the selectable GUI items of the group in an order reflecting one or more of: an order of selection of the selectable GUI items of the group, a location of each of the selectable GUI items of the group with respect to the one or more action GUI elements, and/or the like.

In a further implementation form of the first, second, and/or third aspects, the one or more unique attributes are members of a group consisting of: one or more unique visual attributes, one or more unique audible attributes, and/or a combination thereof.

In a further implementation form of the first, second, and/or third aspects, the one or more unique visual attributes are members of a group consisting of: a color, a texture, a symbol, an icon, a shape, a text, and/or the like.

In an optional implementation form of the first, second, and/or third aspects, one or more of the action GUI elements are associated with an animation generated based on one or more of the unique visual attributes of all of the selectable GUI items of the group.

In an optional implementation form of the first, second, and/or third aspects, one or more machine learning models are used to generate the animation based on one or more of the unique visual attributes of all of the selectable GUI items of the group.

In an optional implementation form of the first, second, and/or third aspects, one or more visual parameters of one or more of the action GUI elements are adjusted to enhance their presentation when adjusted to aggregate one or more of the unique visual attributes of all of the selectable GUI items of the group.

In a further implementation form of the first, second, and/or third aspects, the one or more unique audible attributes are members of a group consisting of: a tone, a sound, a musical note, and/or the like.

In an optional implementation form of the first, second, and/or third aspects, one or more of the action GUI elements are associated with an audio sequence generated based on the one or more unique audible attribute of all of the selectable GUI items of the group.

In an optional implementation form of the first, second, and/or third aspects, one or more machine learning models are used to generate the audio sequence based on one or more unique of the audible attribute of all of the selectable GUI items of the group.

In a further implementation form of the first, second, and/or third aspects, each of the plurality of selectable GUI items is selectable by one or more of: clicking the respective selectable GUI item, hovering over the respective selectable GUI item, and/or touching the respective selectable GUI item.

In a further implementation form of the first, second, and/or third aspects, each of the plurality of selectable GUI items is selectable by dragging the respective selectable GUI item and dropping it over one or more of the action GUI elements.

In a further implementation form of the first, second, and/or third aspects, in response to indication of selection of each of the plurality of selectable GUI items, the respective selected selectable GUI item is visually adjusted to indicate it is selected.

In a further implementation form of the first, second, and/or third aspects, the respective selected selectable GUI item is visually adjusted by applying one or more visual effects to the respective selected selectable GUI item. The one or more visual effects are members of a group consisting of: checking a checkbox associated with the respective selected selectable GUI item, highlighting the respective selected selectable GUI item, creating a background for the respective selected selectable GUI item, creating a shadow for the respective selected selectable GUI item, modifying a brightness of the respective selected selectable GUI item, modifying a hue of the respective selected selectable GUI item, and/or the like.

In a further implementation form of the third aspect, the one or more actions initiated in response to activation of one or more of the action GUI elements comprise initiating a respective one of a plurality of visual elements in the GUI for each selected selectable GUI item of the group.

In a further implementation form of the third aspect, each of the plurality of visual elements is characterized by the one or more unique attribute of the respective selected selectable GUI item.

In a further implementation form of the first, second, and/or third aspects, each of the plurality of selectable GUI items represents a respective one of a plurality of workflows and the one or more action GUI elements are configured to initiate a dashboard in the GUI which comprises a plurality of boards each for managing a respective one of the plurality of workflows associated with each selected selectable GUI item of the group.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

Figure 4A:
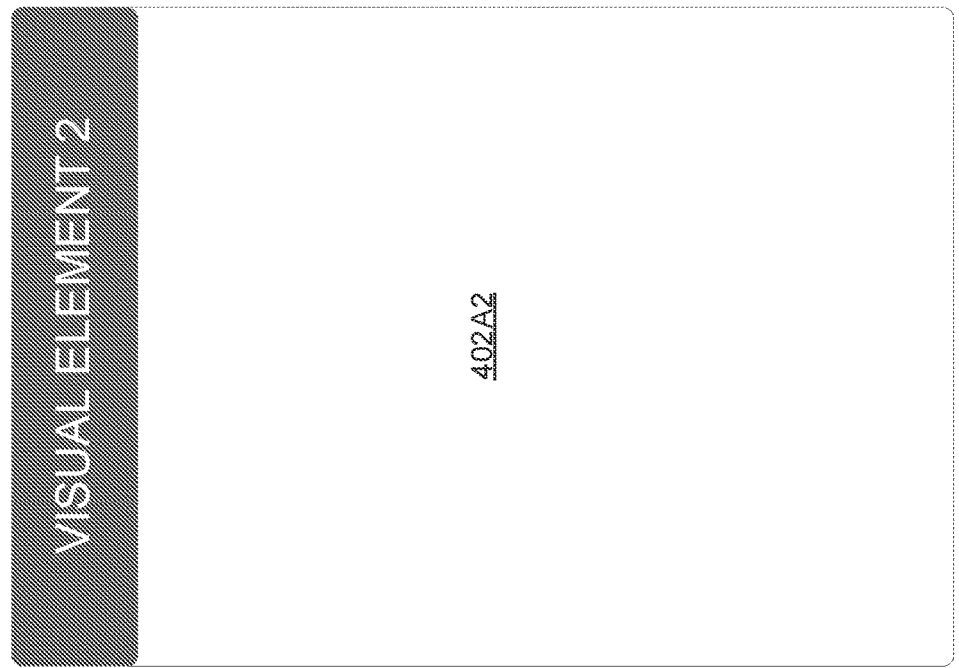
Figure 4A:
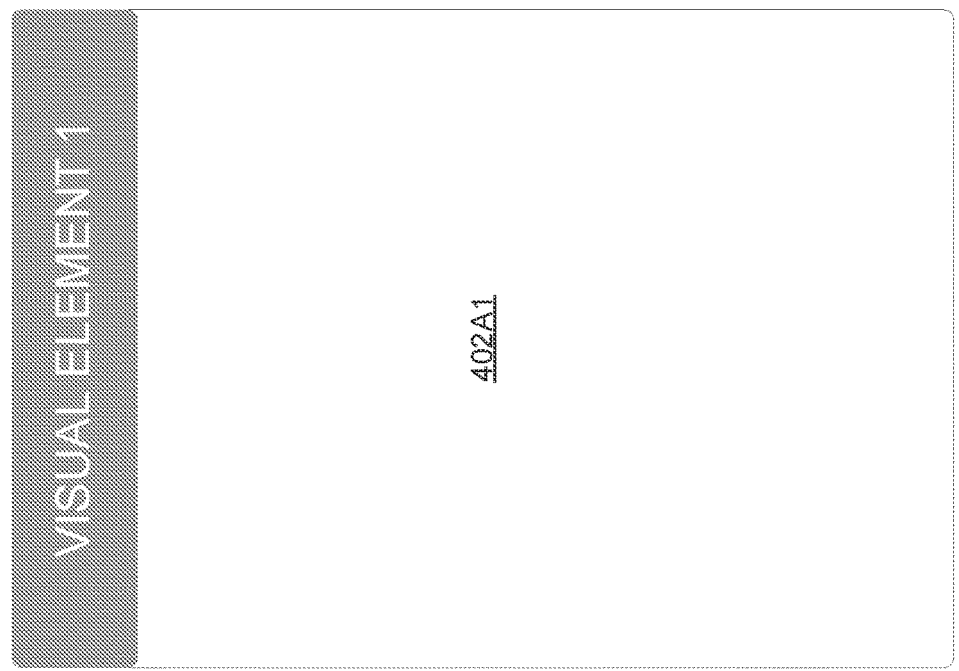
Figure 4B:
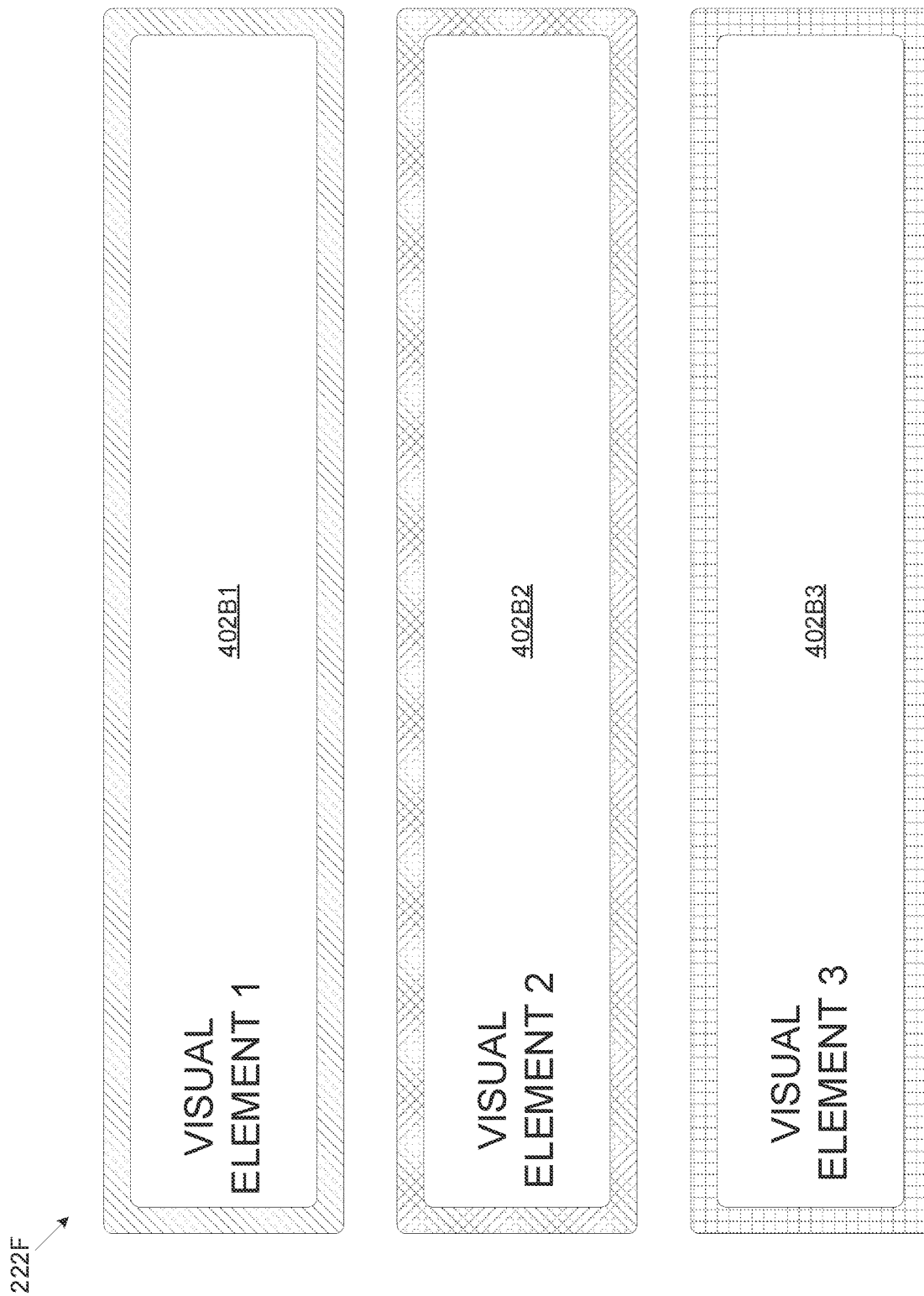
Figure 4C:
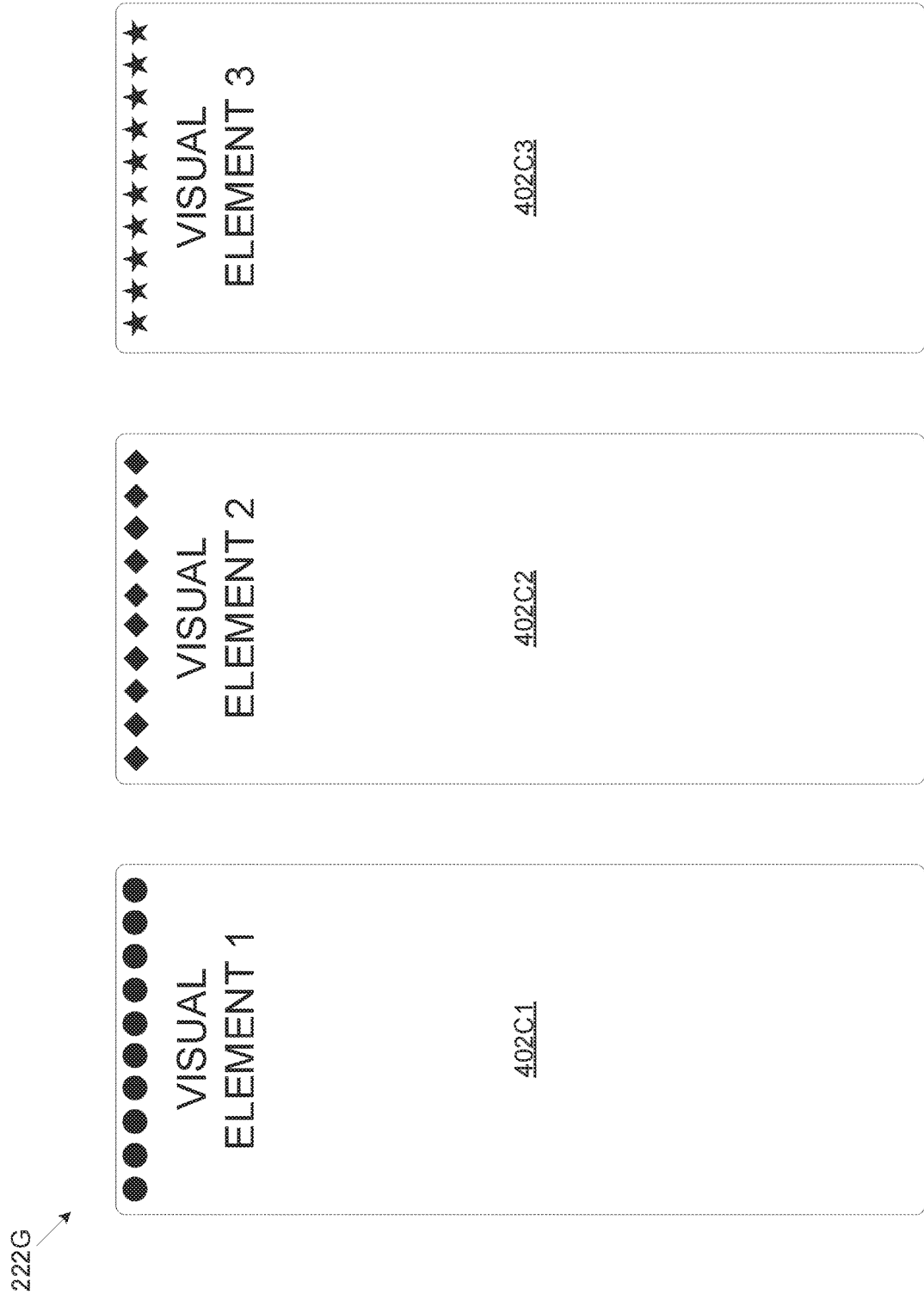
Figure 5A:
Figure 5B:
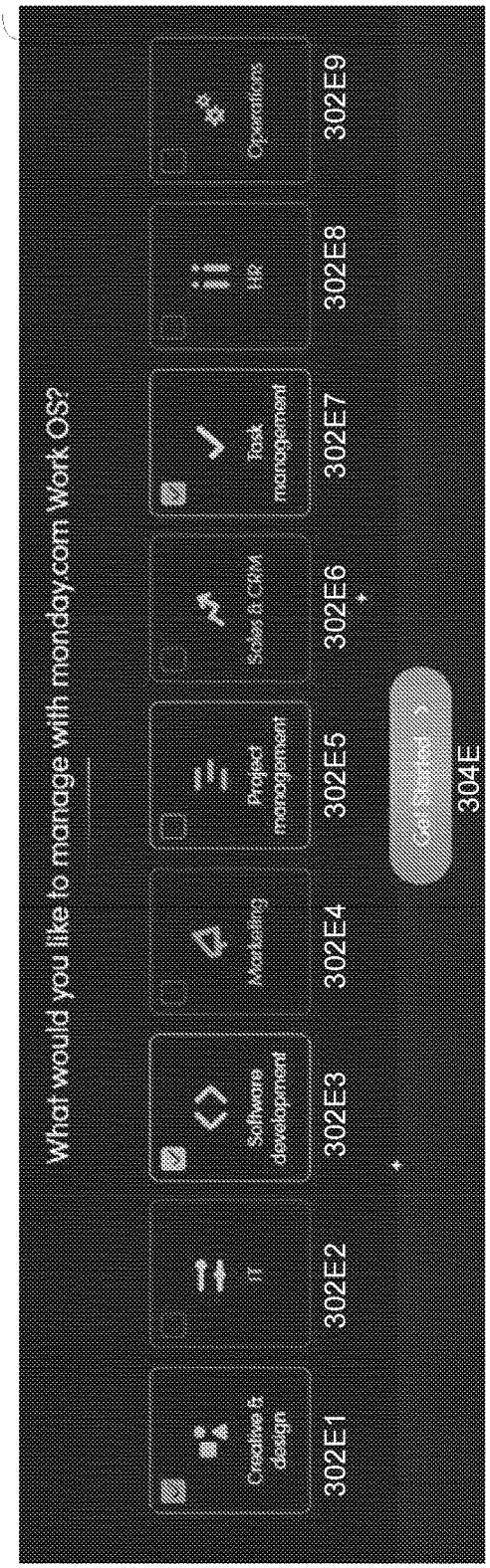

Reference is now made to FIG. 3A, FIG. 3B, FIG. 3C, FIG. 3D, FIG. 3E. FIG. 3F, FIG. 3G, FIG. 3H and FIG. 3I, which are schematic illustrations of exemplary GUIs supporting multi-selection of selectable GUI items presented on a screen each having one or more unique visual attributes, according to some embodiments of the present invention;

Reference is now made to FIG. 4A, FIG. 4B, FIG. 4C and FIG. 4D, which are schematic illustrations of exemplary visual elements initiated in response to multi-selection of selectable GUI items which are characterized by unique visual attributes of the selected selectable GUI items, according to some embodiments of the present invention; and Reference is now made to FIG. 5A and FIG. 5B, which are schematic illustrations of an exemplary dashboard GUI of an exemplary workflow management application supporting multi-selection of selectable GUI items presented on a screen, according to some embodiments of the present invention.

DETAILED DESCRIPTION

The present invention, in some embodiments thereof, relates to adjusting GUI elements according to user selection, and, more specifically, but not exclusively, to adjusting GUI elements according to user multi-selection of a plurality of selectable GUI items to visually reflect all the selected items.

According to some embodiments of the present invention, there are provided methods, systems, and computer program products for adjusting an application GUI to reflect multi-selection of multiple selectable GUI items of the GUI by user interacting with the application via its GUI.

One or more user oriented applications, mobile application, web application, website, tool, agent and/or the like (collectively designated application) executed by a client device used by a user (e.g. e.g. server, computer, Smartphone, tablet, Smart watch, wearable device, etc.) may comprise a GUI for interacting with the users. Such applications may include, for example, a workflow management application, a software development platform, a financial application, a game, a social media application, a shopping application and/or the like.

The GUI may include a plurality of GUI elements, for example, a window, a menu, a list, a drop down list, a scroll bar, an icon, a symbol, a tab, a control element (e.g. button), a text box, a data box, and/or the like. At least some of the GUI elements may be selectable GUI items which may be selected by the user for interacting with the application to trigger one or more actions of the application according to the selected selectable GUI items.

In particular, one or more of the GUI elements, for example, an action GUI element such as, for example, a button, a bar, an icon, and/or the like may be used by the user to activate and trigger initiation of the actions of the application corresponding to one or more of the selectable GUI items. As such, responsive to activation of the action GUI element by the user, for example, clicking, selecting, touching, and/or the like, the application may be triggered to initiate one or more actions according to selectable GUI items selected by the user.

Moreover, one or more of the GUI's action GUI elements may be configured to initiate one or more actions relating to multiple selectable GUI items in response to a single activation. This means that the user may make a multi-selection and select a group of multiple selectable GUI items presented by the GUI and then activate the action GUI element which will trigger the application to initiate one or more actions according to the user's multi-selection, i.e., according to all of the selectable GUI items selected by the user.

In order to reflect the multi-selection, the action GUI element, the action GUI element may be adjusted to reflect the selection of each of the selectable GUI items selected by the user in a cumulative and/or aggregated manner such that all of the selectable GUI items selected by the user so far are reflected by the action GUI element.

To this end, each of the selectable GUI items may be characterized by one of more unique attributes, for example, visual attributes, audible attributes and/or a combination thereof. The visual attributes may include, for example, color, texture, symbol, icon, shape, text, and/or a combination thereof. The unique audible attributes may include, for example, a tone, a sound, a musical note, and/or the like.

The action GUI element may be therefore adjusted to include one or more of the unique attribute(s) of all of the selectable GUI items of the group selected by the user. Specifically, the action GUI element may be gradually adjusted such that in response to indication of selection of each selectable GUI item, the unique attribute(s) of the respective selectable GUI item may be appended to the action GUI element such that the action GUI element is dynamically adjusted to aggregate (accumulate) the unique attribute(s) of all of the selectable GUI items of the group selected by the user. In other words, the unique attribute(s) of each selected selectable GUI items may be appended to the action GUI element without removing and/or replacing the unique visual attribute(s) of any previously selected selectable GUI item.

For example, assuming each of the selectable GUI items is characterized by a respective visual attribute unique to the respective selectable GUI item, for example, a color. In such case, responsive to selection of each selectable GUI item (by the user), the action GUI element may be adjusted to append to it the color of each selected selectable GUI item such that (visual appearance of) the action GUI element will include the colors of all of the selectable GUI items selected by the user.

In another example, assuming each of the selectable GUI items is characterized by a respective audible attribute unique to the respective selectable GUI item, for example, a tone. In such case, responsive to selection of each selectable GUI item (by the user), the action GUI element may be adjusted to append to it the tone of each selected selectable GUI item such that a tune associated with the action GUI element may include the tones of all of the selectable GUI items selected by the user.

Moreover, whenever the user de-selects a selected selectable GUI item, i.e., de-selects a selectable GUI item of the group of previously selected selectable GUI items, the action GUI element may be adjusted to remove the unique attribute(s) of the de-selected selectable GUI item.

Optionally, the action GUI element may be associated with an animation generated based on the visual attributes of the selected selectable GUI items. Moreover, optionally, the animation may be created using one or more Machine Learning (ML) models, for example, a generative model trained to generate animations based on visual attributes.

Optionally, the action GUI element may be associated with an audio sequence (e.g., tune, soundtrack, etc.) generated based on the audible attributes of the selected selectable GUI items. Moreover, optionally, the audio sequence may be created using one or more ML models, for example, a generative model trained to generate audio sequences based on audible attributes.

One or more of the actions initiated by the application responsive to activation of the action GUI element may involve and/or comprise initiation of one or more (next-stage) visual elements (GUI element), for example, a window, a menu, a symbol, an icon, and/or the like. Moreover, one or more of the actions may involve and/or comprise initiation of a plurality of visual elements each with respect to a respective one of the selectable GUI items of the group selected by the user.

Optionally, in order to maintain a link between each selected selectable GUI item of the group and its corresponding next stage visual element presented to the user via the GUI, one or more of the visual elements lunched in response to activation of the action GUI element may be also characterized by one or more of the unique attributes of their corresponding selectable GUI item of the group, for example, a unique visual attribute, a unique audible attribute and/or a combination thereof.

Dynamically adjusting the action GUI element(s) according to multi-selection of multiple selectable GUI items to visually and/or audibly reflect the unique attributes of all of the selected selectable GUI items may present major benefits and advantages.

First, by just inspecting the action GUI element which aggregates the attributes of all selected selectable GUI items, for example, viewing appearance of the action GUI element in case of visual attributes and/or listening to an audio sequence associated with the action GUI element in case of audible attributuers, the user may instantly identify which of the selectable GUI items he already selected without going over the selectable GUI items themselves to check which of them is selected or not. This instant detection may significantly improve the user experience of the user interacting with the application and its GUI. Moreover, instantly reflecting selectable GUI items which are selected may significantly increase engagement of the user with the application, specifically in case multiple GUIs are be presented to the user, since the user may immediately associate each action GUI element with the selectable GUI elements of the same GUI and its corresponding application.

Moreover, adjusting the action GUI element to express, reflect and/or indicate all of the selectable GUI items selected by the user may clearly convey to the user the fact that the actions initiated by activating the action GUI element may relate to multiple selectable GUI items rather than just one as may be the case with many existing GUIs.

Furthermore, adjusting the action GUI element to express and visually reflect all of the selected selectable GUI items may significantly increase the awareness and/or understanding of the user interacting with the GUI to the extensive functionality, flexibility, and/or interoperability offered and supported by the application which may further improve the user experience of the user interacting with the application and its GUI.

In addition, carrying on the unique attribute(s) of a certain selected selectable GUI item(s) in subsequent GUI screens to maintain may form a coherent, consistent and systematic connection between the selected selectable GUI items and their corresponding visual elements presented later on which may further improve the user experience of the user interacting with the application and its GUI. Moreover, applying the same unique attributes to the next stage(s) screens and GUI elements may further increase engagement of the user with the application and its GUI since a clear and intuitive link is maintained along the sequence of screens and GUI elements presented to the user chain the user while using the application.

These advantages were successfully demonstrated via extensive experiments with a large number of potential users in which it was shown that adjusting the action GUI element to cumulatively reflect all of the selectable GUI items selected by the user significantly increased user experience and highly encouraged the users to engage, interact and/or explore the application.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
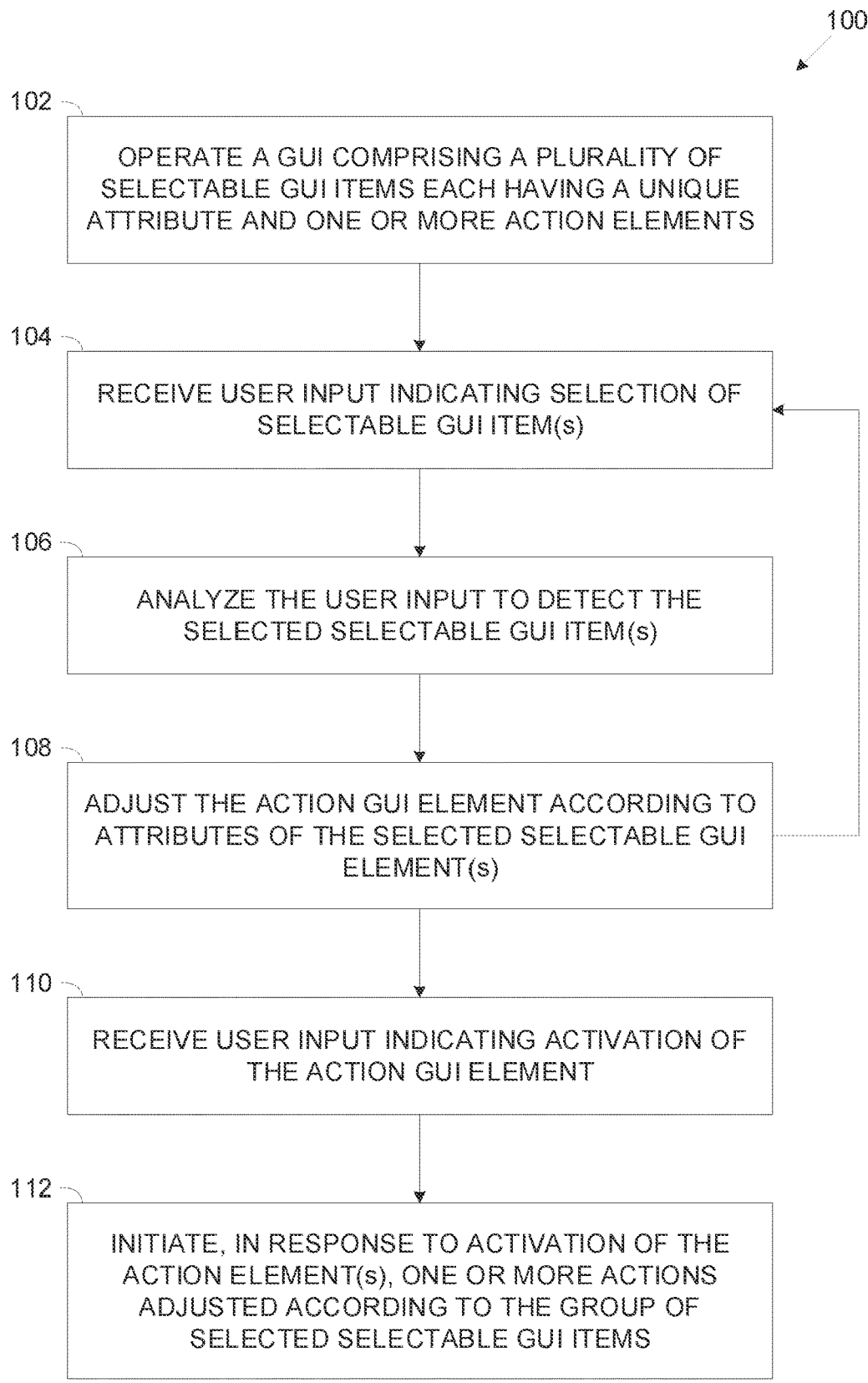
FIG. 1 is a flowchart of an exemplary process of adjusting GUI elements according to user multi-selection of a plurality of selectable GUI items to reflect all selected items, according to some embodiments of the present invention.

Referring now to the drawings, FIG. 1 is a flowchart of adjusting GUI elements according to user multi-selection of a plurality of selectable GUI items to reflect all selected items, according to some embodiments of the present invention.

A process 100 may be executed to adjust and/or generate a GUI of an application to reflect multi-selection of a plurality of selectable GUI items (items) by a user. In particular, one or more activation elements of the GUI presented to the user, for example, a launch bar, an activation button, and/or the like.

In particular, each of the selectable GUI items may have one or more unique attributes, for example, a unique visual attribute, a unique audible (sound) attribute, and/or the like and optionally a combination thereof.

As such, in response to a plurality of indications indicating selection of a group of multiple selectable GUI items by the user, one or more of the activation elements of the GUI may be according to the unique features of the selected selectable GUI items thus reflecting the multi-selection to the user.

Moreover, in response to activation of the activation element(s) by the user, one or more actions may be initiated according to the selected selectable GUI.

Figure 2:
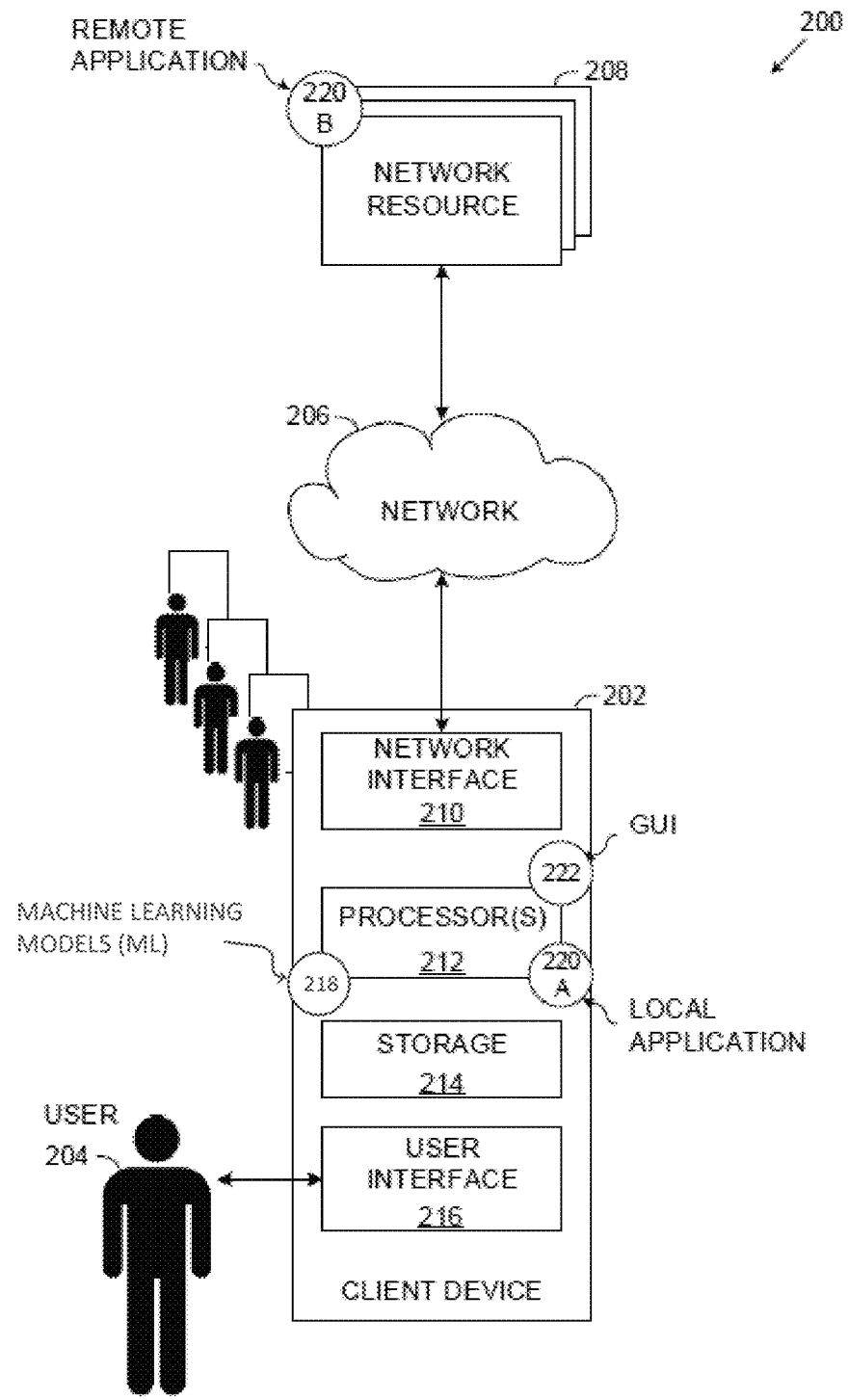
FIG. 2 is a schematic illustration of an exemplary system for adjusting GUI elements according to user multi-selection of a plurality of selectable GUI items to reflect all selected item, according to some embodiments of the present invention.

Reference is also made to FIG. 2, which is a schematic illustration of an exemplary system for adjusting GUI elements according to user multi-selection of a plurality of selectable GUI items to reflect all selected item, according to some embodiments of the present invention.

An exemplary system 200 may comprise a client device 202, for example, a server, a desktop computer, a laptop computer, a Smartphone, a tablet, a wearable device, a proprietary client device and/or the like used by one or more associated users 204 to execute and/or access one or more applications 220 each having a GUI 222 for interacting with the user 204.

The applications 220, for example, PC applications, mobile applications, online applications, web applications, websites, tools, agents and/or the like are user oriented applications configured to interact with the user 204 via the GUI 222. Such applications 220 may include, for example, a workflow management application, a software development platform, a financial application, a game, a social media application, a shopping application and/or the like may comprise a GUI for interacting with the user.

For example, the application 220 may be a workflow management application 220 having a GUI 222 adapted to feature a dashboard to enable the user 204 to manage workflows. In another example, the application 220 may be an online shopping service and/or platform having a GUI 222 adapted to enable the user 204 to collect and purchase items.

For brevity, the process 100 and the system 200 are described for a single user 204 using a single client device 202. Moreover, for brevity, a single application 220 is described herein after to be executed by the client device 202. This however, should not be construed as limiting since, as may be apparent to a person skilled in the art, the process 100 and the system 200 may be easily expanded, duplicated and/or scaled to a plurality of client devices such as the client device 202 each executing one or more applications 200 having respective GUIs 222.

The application 220 may comprise a local application 220A executed by the client device 202. For example, the application 220 may comprise one or more stand-alone applications and/or software modules such that the GUI 222 of the application 220 may be generated, adjusted and/or otherwise controlled by the client device 202.

However, optionally, the application 220 may comprise a remote application 220B executed by one or more remote network resources 208, for example, a server, a computing node, a cluster of computing nodes, and/or the like communicatively coupled to the client device 202 via a network 206 comprising one or more wired and/or wireless networks, for example, a Local Area Network (LAN), a Wide Area Network (WAN), a Metropolitan Area Network (MAN), a Wireless LAN (WLAN), a cellular network, the internet, and/or the like.

Moreover, the application 220 may be executed, served and/or otherwise utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

In such embodiments, the client device 202 may execute one or more local web access applications configured to communicate with the remote application 220B via the network 206, for example, a web browser, a mobile application, a local agent and/or the like intermediating between the remote application 220B and the user 204. The GUI 222 may be therefore conveyed and presented to the user 204 via the local web access application(s) which may further receive user input provided by the user 204 and transmit the received user input to the remote application 220B.

Furthermore, the application 220 may be distributed between the client device 202 and one or more of the remote network resources 208 such that part of the application 220 is executed by the client device 202 and another part id executed by the remote network resource(s) 208. In such embodiments, the GUI 222 as well as user input provided by the user 204 may be adjusted, controlled, and/or received by the part of the application 220 which is locally executed by the client device 202.

For brevity, regardless of its exact implementation, architecture and/or deployment, the application 220 is described herein after to control and adjust GUI 222 as well as initiate, execute, and/or control one or more actions according to user input received via the GUI 222. This however, should not be construed as limiting since, as may become apparent to a person skilled in the art, the previously described deployment embodiments as well as other deployments may be applied to execute the application 200 and interact with the user 204 via his associated client device 202.

The client device 202 may include a processor(s) 212, a storage 214, a user interface 216 and optionally a network interface 210 for connecting to the network 206.

The processor(s) 212, homogenous or heterogeneous, may include one or more processors arranged for parallel processing, as clusters and/or as one or more multi core processors. The storage 214 may include one or more non-transitory persistent storage devices, for example, a Read Only Memory (ROM), a Flash array, a Solid State Drive (SSD), a hard drive (HDD) and/or the like. The storage 214 may also include one or more volatile devices, for example, a Random Access Memory (RAM), a cache memory and/or the like.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212.

The processor(s) 212 may optionally integrate, utilize and/or facilitate one or more hardware elements (modules) integrated, utilized and/or otherwise available in the mobile device 202, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU) and/or the like.

The processor(s) 212 may therefore execute one or more functional modules implemented using one or more software modules, one or more of the hardware modules and/or combination thereof. For example, the processor(s) 212 may execute the local application 220A and/or its GUI 222. Additionally, and/or alternatively, as described herein before, in case of the remote application 220B, the processor(s) 212 may execute one or more of the web access application intermediating between the remote application 220B, specifically its GUI 222 and the user 204.

The user interface 216 may include one or more Human-Machine Interfaces (HMI) for interacting with the user 204. For example, the user interface 216 may comprise a display, for example, a screen (display), a projector, a touchscreen and/or the like for rendering images and presenting them to the user 204. The user interface 216 may further include one or more HMI interfaces for receiving user input, for example, a touch surface, a touchscreen, a touchpad, a keyboard, a pointing device, a digital pen, a microphone and/or the like.

Optionally, the client device 202 may include one or more 3 dimensional (3D) devices, for example, a stereoscopic goggles, a 3D Helmet Mount Display (HMD), and/or the like configured to project a 3D display to the user 232. The user interface 216 of such 3D client devices 202 may optionally include one or more 3D input HMIs configured to receive user input, for example, via hand gestures, body motion, and/or the like which may be captured by one or more sensors coupled to the client device 230, for example, an image sensor, a motion sensor (e.g., accelerometer, a gyroscope, etc.), a proximity sensor, and/or the like.

The network interface 210 may include one or more wired and/or wireless interfaces for connecting to the network 206, for example, a LAN interface, a WLAN interface (Wi-Fi), a cellular interface, and/or the like through which the client device 202 may communicate with one or more of the remote network resources 208 connected to the network 206, for example, a server, a storage server, a data center a database, a cloud service and/or platform and/or the like.

As shown at 102, the process 100 starts with operating the GUI 222, for example, by the application 220, to present a plurality of selectable GUI items which the user 204 may select in order to interact with the application 200 which, in response, may initiate one or more actions accordingly.

The GUI 222 may include a plurality of GUI elements, for example, a window, a menu, a list, a drop down list, a scroll bar, an icon, a symbol, a tab, a control element (e.g. button), a text box, a data box, and/or the like. At least some of these GUI elements may be selectable GUI items which may be selected by the user 204 for interacting with the application 220. The GUI 222 may therefore include a plurality of selectable GUI items which the user 204 may select.

Each of the selectable GUI items may be characterized by one of more unique attributes differentiating it from the other selectable GUI items, for example, unique visual attributes, unique audible (sound) attributes, and/or the like and optionally a combination thereof.

The unique visual attributes may include, for example, color, texture, symbol, icon, shape, text, and/or a combination thereof. The unique audible attributes may include, for example, a tone, a sound, a musical note, and/or the like. One or more of the selectable GUI items may be further cauterized by a combination of one or more unique visual attributes and unique audible attributes.

The GUI 222 may further comprise one or more action GUI elements, for example, a button, a tab, a symbol, an icon, and/or the like. In response to activation of each action GUI element, one or more actions may be initiated, for example, by the application 220.

Moreover, one or more of the initiated actions may be adjusted according to the selection of one or more of the selectable GUI items by the user 204. In particular, one or more of the action GUI elements may trigger the application 220 to initiate one or more actions relating to multiple selectable GUI items selected by the user 204. This means that the user may select a plurality of selectable GUI items which will not trigger the application to initiate action(s), and after making the multi-selection of the selectable GUI items, responsive to activation of the action GUI element(s), the application 220 may initiate the action(s) according to the selected selectable GUI items.

As shown in 104, user input indicative of selection of one or more of the selectable GUI items may be provided by the user 204 and received, for example, by the application 220. In particular, the user input received by the application 220 may include a plurality of indications indicated by the user 204 for selecting a group of the selectable GUI items from the plurality of selectable GUI items of the GUI 222.

Typically, the user 204 may gradually select the selectable GUI items of the group one after the other rather than selecting multiple selectable GUI items at once. The plurality of indications indicating selection of the group of multiple selectable GUI items may be therefore gradually received and accumulated by the application 220.

The GUI 222 may employ one or more techniques, implementations, and/or designs to enable the user 204 to select the selectable GUI items. For example, the user 204 may select one or more of the selectable GUI items by clicking (on) the respective selectable GUI item using a pointing device, hovering with a pointing device over the respective selectable GUI item, touching the respective selectable GUI item in a touchscreen, and/or the like. In another example, the user 204 may select one or more of the selectable GUI items by dragging the respective selectable GUI item and dropping it over one or more other GUI elements of the GUI 222, for example, one or more of the action GUI elements.

As shown at 106, the received user input may be analyzed, for example, by the application 200, to detect the plurality of selectable GUI elements of the group selected by the user 204.

Optionally, in response to indication of selection of each of the plurality of selectable GUI items of the group by the user 204, the respective selected selectable GUI item may be visually adjusted to indicate it is selected such that it is visible to the user 204 that respective selectable GUI item is selected.

One or more of the selected selectable GUI items may be adjusted to visually reflect that they are selected by applying one or more visual effects to the respective selected selectable GUI item. The visual effects may include, for example, checking a checkbox associated with the respective selected selectable GUI item. In another example, the visual effects may include highlighting the respective selected selectable GUI item. In another example, the visual effects may include creating a background for the respective selected selectable GUI item. In another example, the visual effects may include creating a shadow for the respective selected selectable GUI item. In another example, the visual effects may include modifying a brightness of the respective selected selectable GUI item. In another example, the visual effects may include modifying a hue of the respective selected selectable GUI item.

As shown in 108, in response to detection of each of the plurality of indications of the selectable GUI elements of the group, one or more of the action GUI elements of the GUI 222 may be adjusted accordingly, for example, by the application 200.

In particular, the action GUI element(s) may be dynamically and gradually adjusted to aggregate one or more of the unique attributes of each of the selectable GUI items added to the group as indicated by selection of by the user 204 such that the respective action GUI element may reflect the multi-selection of all of the selectable GUI items of the group.

As stated herein before, the user 204 may typically indicate selection of the selectable GUI items of the group in a sequential gradual manner rather than simultaneously. The respective action GUI element may be therefore also adjusted in a gradual manner following the selection events of the selectable GUI items by the user 204 as indicated in the indications of the user input.

As such, steps 104, 106, and 108 of the process 100 may be repeated through a plurality of iterations where in each iteration the user 204 may select a respective one of the selectable GUI items of the group. As such the respective action GUI element may be gradually adjusted to include the unique attribute of each most recently selected selectable GUI item detected by the indications received in the user input.

Specifically, the unique attribute(s) of each selected selectable GUI item may be appended to the action GUI element such that the action GUI element is adjusted to aggregate the unique attribute of all of the selectable GUI items in the selected group. In other words, the action GUI elements is gradually adjusted to eventually include one or more unique attributes of each of the selectable GUI items of the group.

This means that, in response to a first indication indicating selection of a first selectable GUI item of the group by the user 204, the action GUI element may be adjusted to include one or more of the unique attributes of the first selectable GUI item. Afterwards, in response to a second indication indicating selection of a second selectable GUI item of the group by the user 204, the action GUI element may be adjusted by appending one or more of the unique attributes of the second selectable GUI item to the action GUI element. In case another indication is received indicating selection of a third selectable GUI item of the group by the user 204, the action GUI element may be further adjusted by appending one or more of the unique attributes of the third selectable GUI item to the action GUI element and so on.

Moreover, the user input, received from the user 204 in step 104 and analyzed in step 106, may indicate deselection of one or more of the selectable GUI items which were previously selected. This means that user 204 may first select one or more of the selectable GUI items and then deselect one or more of these previously selected selectable GUI items. In such case, responsive to detection of deselection of one or more of the selectable GUI items of the group, the action GUI element may be adjusted to remove the unique attribute(s) of the deselected selectable GUI item(s) from the action GUI element.

Optionally, the action GUI element may be adjusted to aggregate the unique visual attribute of all of the selectable GUI items of the group according to an order reflecting selection of the selectable GUI items to the group.

For example, the action GUI element may be adjusted to aggregate the unique attributes of all of the selectable GUI items according to an order of selection of the selectable GUI items to the group. For example, the action GUI element may be adjusted to include the unique attributes of all of the selectable GUI items ordered from the first selected selectable GUI item to the last selected selectable GUI items.

In another example, the action GUI element may be adjusted to aggregate the unique attributes of all of the selectable GUI items according to a relative location of each selectable GUI item of the group with respect to the action GUI element. For example, assuming the selectable GUI items are presented in a line to the left of the action GUI element. In such case the action GUI element may be adjusted to include the unique attributes of the selectable GUI item selected to the group according to their location with respect to the action GUI element, for example, the furthest (left most) selectable GUI item first, followed by the selectable GUI item next furthest from the action GUI element and so on until the selectable GUI item closest to the action GUI element (right most).

The ordering may depend on the nature and/or type of the unique attributes of the selectable GUI items.

For example, assuming the unique attributes comprise unique visual attributes, for example, each of the selectable GUI items is characterized by a unique color. Further assuming the ordering is based on the order of selection of the selectable GUI items to the group. In such case, the action GUI element may be adjusted to aggregate the colors of all of the selectable GUI items of the group according to their order of selection in a gradient manner starting from the unique visual attribute(s) of the earliest selected selectable GUI item followed by the unique visual attribute(s) of the next selected selectable GUI item until the unique visual attribute(s) of the latest (most recent) selected selectable GUI item.

Optionally, in case the unique attributes comprise visual attributes, one or more of the action GUI elements may be associated, for example, by the application 220, with an animation generated based on one or more of the unique visual attributes of each and all of the selectable GUI items of the group.

For example, assuming the unique visual attributes are symbols such that each of the selectable GUI items is characterized by a unique pattern. In such case, the respective action GUI element may be adjusted to include an animation, for example, a time varying pattern presenting the patterns of all of the selectable GUI items of the group, optionally according to an order, for example, an order of their selection, their order with respect to the action GUI element, and/or the like.

In another example, assuming the unique visual attributes are symbols where each of the selectable GUI items is characterized by (associated with) a unique symbol. In such case, the action GUI element may be adjusted to include an animation, for example, a time varying shape which is painted with the colors of all of the selectable GUI items of the group, optionally according to an order and/or arrangement reflecting one or more selection attributes relating to selection of the selectable GUI items, for example, an order of their selection, their location with respect to the action GUI element, and/or the like.

Optionally, one or more Machine Learning (ML) models 218, for example, a neural network, a generative network, a Support Vector Machine (SVM) and/or the like may be used to generate the animation for one or more of the action GUI elements based on the unique visual attributes of all of the selectable GUI items of the group. The ML models 218, for example, Dall-E, MidJourney, Disco Diffusion, Artbreeder, and/or the like may be trained to create animations based on a collection of visual attributes, for example, a color, a patterns, a texture, a symbol, an icon, a shape, and/or the like.

Optionally, the GUI 222 may be adjusted to enhance presentation of one or more of its elements which may be degraded. For example, when one or more of the action GUI elements are adjusted to aggregate the unique visual attributes of all of the selectable GUI items selected to the group, the presentation (view) of the respective action GUI element may be degraded and may reduce visibility of the action GUI element and/or one or of its visual features. Therefore, in order to enhance presentation of the respective action GUI element, one or more visual parameters of the respective action GUI element, for example, a brightness, a contrast, a color, a hue, and/or the like may be adjusted. For example, assuming a certain action GUI element comprises text, specifically black colored text. Further assuming that the unique visual attributes of the selectable GUI items are colors. In such case, when adjusting the certain action GUI element to include the colors of the selected selectable GUI items, the black text may become highly invisible and/or unreadable. In such case, one or more of the visual parameters of the text of the certain action GUI element may be adjusted, for example, change the text color to white, make the text bold, increase contrast of the text, and/or the like.

Optionally, in case the unique attributes comprise audible attributes, one or more of the action GUI elements may be associated, for example, by the application 220, with an audio sequence generated based on one or more of the unique audible attributes of each and all of the selectable GUI items of the group.

For example, assuming the unique audible attributes are tones such that each of the selectable GUI items is characterized by a unique tone. In such case, the respective action GUI element may be adjusted to include an audio sequence constructed of the tones of all of the selectable GUI items of the group, optionally according to an order, for example, an order of their selection, their order with respect to the action GUI element, and/or the like.

Optionally, one or more ML models 218, for example, a neural network, a generative network, an SVM and/or the like may be used to generate the audio sequence for one or more of the action GUI elements based on the unique audible attributes of all of the selectable GUI items of the group. The ML models 218, for example, Jukebox, Riffusion, Boomy, Soundraw, and/or the like may be trained to create audio sequences (sound tracks) based on a collection of audible attributes, for example, a note, a tone, a sound, and/or the like.

Reference is now made to FIG. 3A, FIG. 3B, FIG. 3C, FIG. 3D, FIG. 3E. FIG. 3F, FIG. 3G, FIG. 3H and FIG. 3I, which are schematic illustrations of exemplary GUIs supporting multi-selection of selectable GUI items presented on a screen each having one or more unique visual attributes, according to some embodiments of the present invention.

FIG. 3A, FIG. 3B, FIG. 3C, FIG. 3D, FIG. 3E. FIG. 3F, FIG. 3G, FIG. 3H and FIG. 3I portray exemplary GUIs such as the GUI 222 of one or more exemplary applications such as the application 200 executed by one or more client devices such as the client device 202 used by one or more users such as the user 204 may be presented on the screen (display) of the client device(s) 202.

Each of the GUIs may present (display) a plurality of GUI elements and items, specifically plurality of selectable GUI items 302 and one or more action GUI elements 304.

Figure 3A:
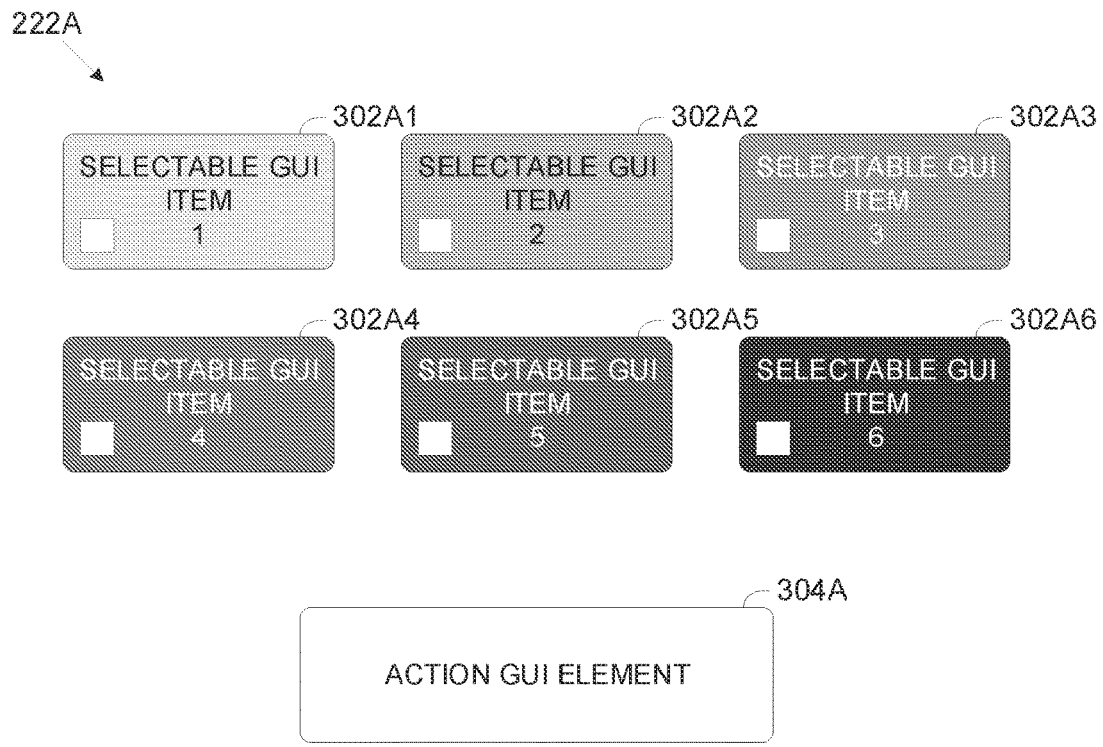
Figure 3B:
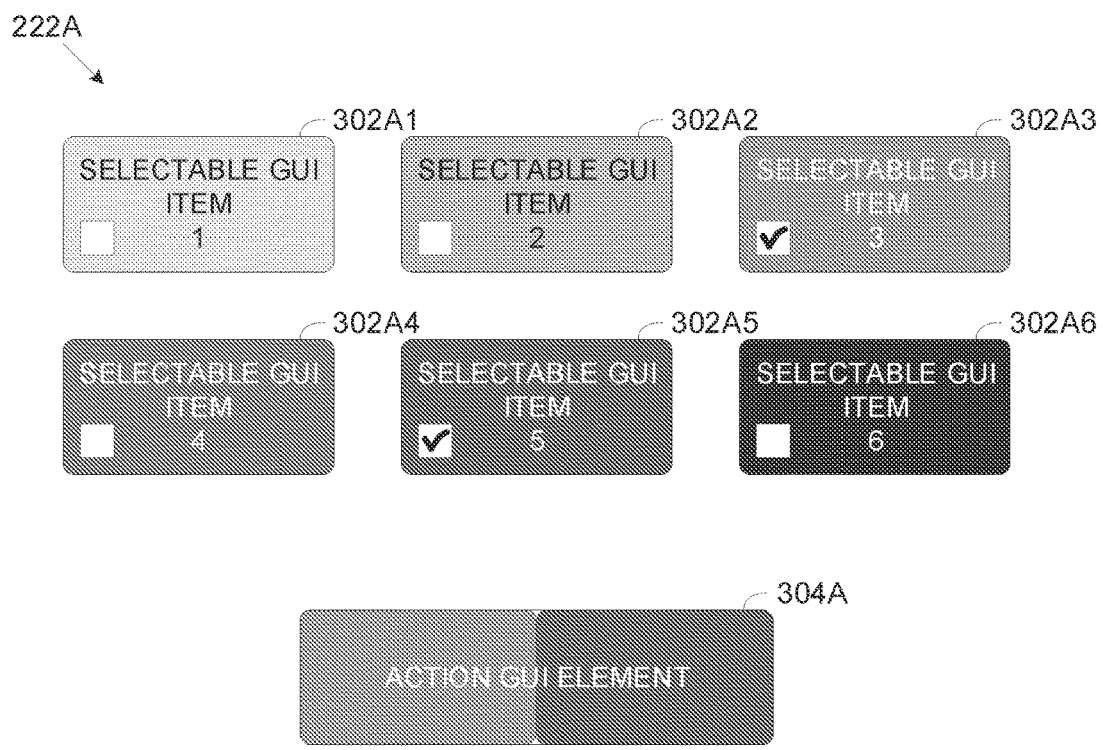

As seen in FIG. 3A and FIG. 3B, an exemplary GUI 222A such as the GUI 222 of an exemplary application such as the application 200 may comprise a plurality of GUI elements and items, for example, six selectable GUI items 302A, designated selectable GUI items 302A1 to 302A6, and one action GUI element 304A which the user 204 may interact with to select and/or activate respectively.

In particular, each of the selectable GUI items 302A displayed by the GUI 222A may be characterized by one or more unique attributes, specifically, unique visual attributes, for example, a different color. For example, the $1^{st}$ selectable GUI item 302A1 may be characterized by a light color and each of the succeeding selectable GUI items 302A may be characterized by a darker color to the $6^{th}$ selectable GUI item 302A6 which may be characterized by the darkest color.

The action GUI element 304A on the other hand may be blank (not colored) or it may be painted or colored with a color which does not overlap with any of the colors of the selectable GUI items 302A.

The user 204 interacting with the GUI 222A may indicate selection of each of the selectable GUI items 302A using one or more of the HMIs of the user interface 216 of his client device 202, for example, a pointing device (e.g. mouse, trackball, joystick, touch surface, pointing stick, etc.), a keyboard, a touchscreen and/or the like.

Moreover, the user 204 may indicate selection of a group comprising multiple selectable GUI items 302A of the plurality of selectable GUI items 302A and optionally all of the selectable GUI items 302A.

As described herein before, the user 204 may indicate his selection of the selectable GUI items 302A using one or more methods, techniques and/or designs. For example, the user 204 may click on one or more of the selectable GUI items to indicate selection of the respective selectable GUI item 302A. In another example, one or more of the selectable GUI items 302A may be associated with a checkbox which may be activated (e.g. clicked, touched, etc.) by the user 204 to indicate selection of the respective selectable GUI item 302A. In another example, the user 204 may drag one of more of the selectable GUI items 302A and drop it over the action GUI element 304A to indicate selection of the respective selectable GUI item 302A.

Optionally, as described herein before, in response to indication of selection of one or more of the selectable GUI items 302A, the respective selectable GUI item 302A may be visually adjusted to indicate it is selected. Adjusting the selected selectable GUI items may be done by applying one or more visual effects to the respective selected selectable GUI item 302A. For example, assuming the selected selectable GUI item 302A is associated with a respective checkbox, the checkbox may be checked. In another example, the selected selectable GUI item 302A may be highlighted. In another example, a background may be created for the selected selectable GUI item 302A. In another example, a shadow may be crated for the selected selectable GUI item 302A. In another example, a brightness of the selected selectable GUI item 302A may be modified. In another example, a hue of the selected selectable GUI item 302A may be modified.

In response to an indication of selection of each selectable GUI item 302A, the action GUI element 304A may be dynamically adjusted to reflect the selected selectable GUI item 302A by including the unique visual attribute(s) of the selected selectable GUI item 302A, for example, a color, a pattern, and/or the like in the action GUI element 302A.

In particular, the GUI 222A may support multi-selection of a plurality of the selectable GUI items 302A presented by the GUI and the action GUI element may be adjusted to reflect the multi-selection. For example, the action GUI element 302A may be adjusted by appending the unique visual attribute(s) (e.g., color) of the most recently selected selectable GUI item 302A to the action GUI element 304A which thus aggregates (accumulates) the unique visual attribute(s) (e.g., colors) of all of the selectable GUI items 302A selected so far by the user 204 such all of the selected selectable GUI items 302A are reflected by the action GUI element 304A.

As seen in FIG. 3B, assuming the group of selectable GUI items 302A selected by the user 204 comprises the selectable GUI item 302A1 and the selectable GUI item 302A5 which are indicated accordingly as selected by checking their associated check boxes. In such case the action GUI element 304A may be adjusted to aggregate the unique visual attribute(s), i.e., the color of both the selectable GUI item 302A1 and the selectable GUI item 302A5.

As described herein before, since the user 204 may typically indicate his selection of the selectable GUI items 302A, for example, the selectable GUI item 302A1 and the selectable GUI item 302A5 in a gradual manner, the action GUI element 304A may be also adjusted in a gradual manner following the selection indications of the selectable GUI items 302A. This means that the action GUI element 304A may be initially adjusted to include the color of the selectable GUI item 302A selected first by the user 204 and then the color of the selectable GUI item 302A selected next by the user 204 is appended to the action GUI element 304A.

As such, the action GUI element 304A aggregates (accumulates) the unique visual attribute(s), specifically the colors of all of the selected selectable GUI items 302A and does not remove, discard, or replace the colors of any previously selected selectable GUI item 302A.

Moreover, as described herein before, the action GUI element 304A may be adjusted to aggregate the unique visual attribute(s) of the selected selectable GUI items 302A in an order and/or arrangement reflecting one or more selection attributes relating to selection of the selectable GUI items 302A.

For example, the action GUI element 304A may be visually adjusted according to the order of selection of the selectable GUI items 302A, for example, from right to left such that the color of a first selected selectable GUI element 302A is displayed at the right end of the action GUI element 304A and the color of each selectable GUI element 302A selected afterwards is appended to the left of a previously selected selectable GUI element 302A. In such case, assuming that the selectable GUI item 302A5 is selected first, the action GUI element 304A may be adjusted to show the color of selectable GUI items 302A5 at its right end. Further assuming that the selectable GUI item 302A3 is selected next, the action GUI element 304A may be adjusted to show the color of selectable GUI items 302A3 to the left of the color of the previously selected selectable GUI items 302A1.

In another example, the action GUI element 304A may be visually adjusted according to a location of the selectable GUI items 302A with respect to the action GUI element 304A, for example, from right to left. As such, the color of a selected selectable GUI element 302A located nearest to the action GUI element 304A is displayed at the right end of the action GUI element 304A and the color of each selectable GUI element 302A selected afterwards is appended to the left of the furthest located selectable GUI element 302A according to its location with respect to the action GUI element 304A compared to other selectable GUI item 302A which are selected by the user 204. For example, assuming that the selectable GUI item 302A3 is selected first, the action GUI element 304A may be adjusted to show the color of selectable GUI items 302A3 at its right end. Further assuming that the selectable GUI item 302A5 is selected next, the action GUI element 304A may be adjusted to append the color of selectable GUI items 302A5 to the right of the color of the previously selected selectable GUI items 302A3 since selectable GUI items 302A5 is closer to the action GUI element 304A than the selectable GUI item 302A3.

Figure 3C:
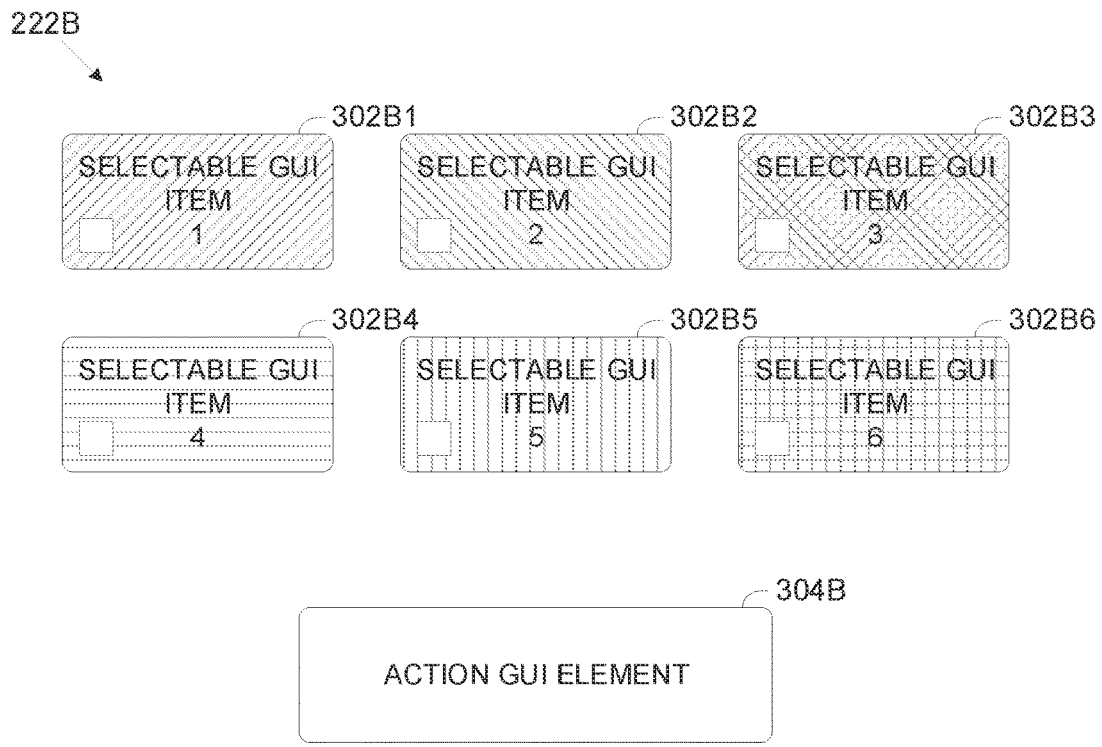
Figure 3D:
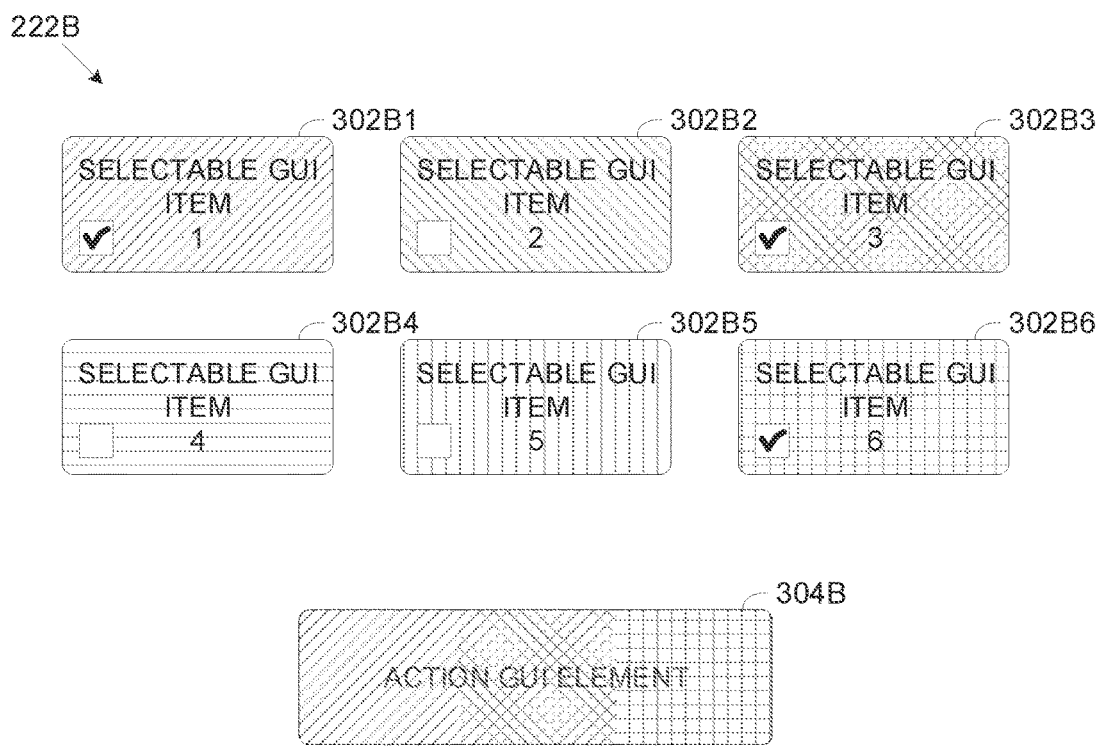

As seen in FIG. 3C and FIG. 3D, another exemplary GUI 222B such as the GUI 222 of an exemplary application such as the application 200 may comprise a plurality of GUI elements and items, for example, six selectable GUI items 302B, designated selectable GUI items 302B1 to 302B6, and one action GUI element 304B which the user 204 may interact with to select and/or activate respectively. Moreover, each of the selectable GUI items 302B may be characterized by one or more unique attributes, specifically, unique visual attributes, for example, a different pattern.

As seen in FIG. 3D, assuming the user 204 may indicate a multi-selection to select a group of three selectable GUI items 302B from the six selectable GUI items 302B, for example, selectable GUI items 302B1, 302B3 and 302B6, which are indicated accordingly as selected by checking their associated check boxes. In such case the action GUI element 304B may be adjusted to aggregate the unique visual attributes, i.e., the patterns of all three selectable GUI items 302B1, 302B3 and 302B6.

Figure 3E:
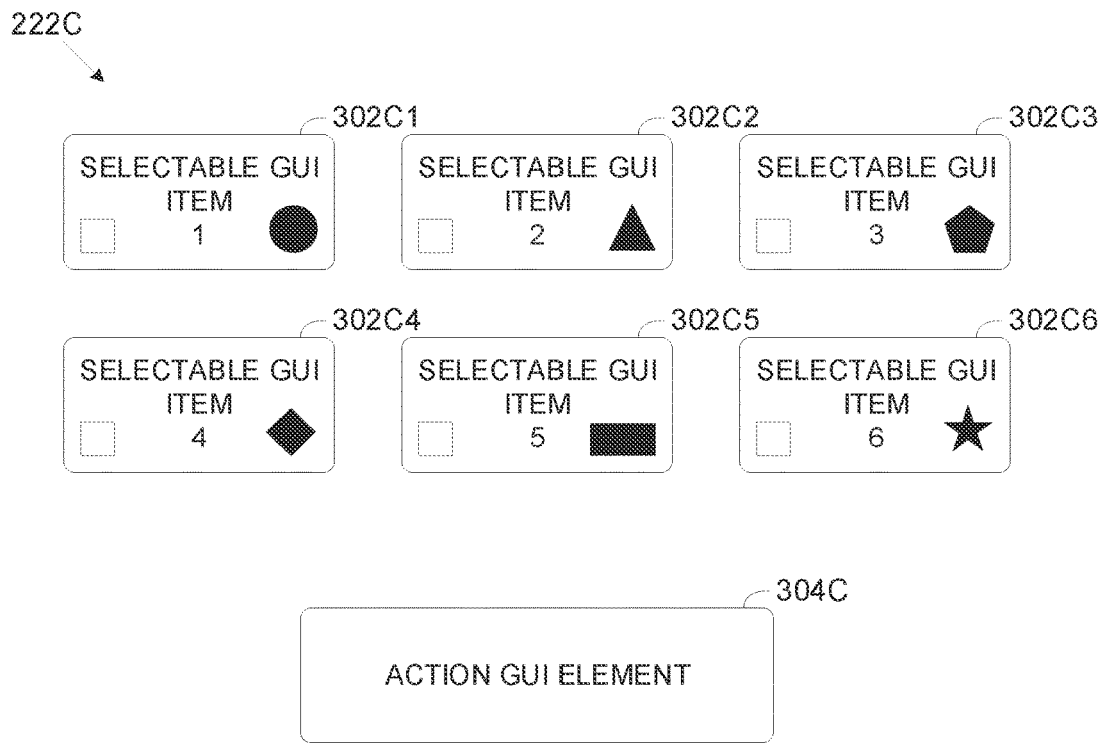
Figure 3F:
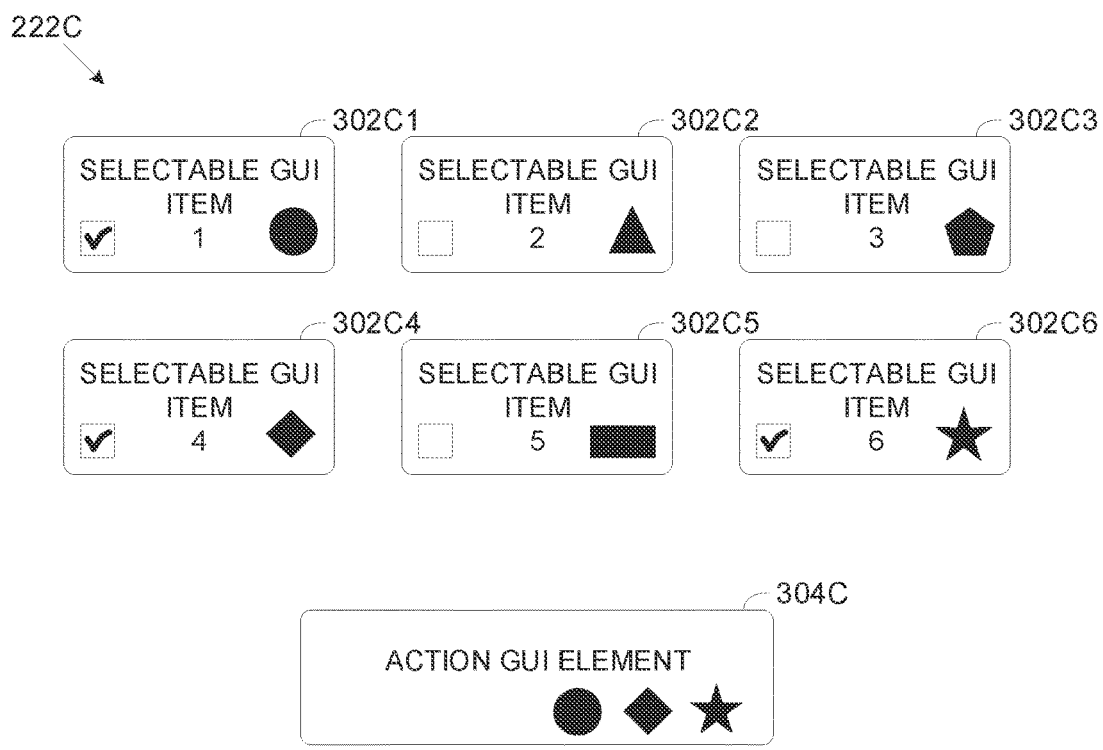

As seen in FIG. 3E and FIG. 3F, another exemplary GUI 222C such as the GUI 222 of an exemplary application such as the application 200 may comprise a plurality of GUI elements and items, for example, six selectable GUI items 302C, designated selectable GUI items 302C1 to 302C6, and one action GUI element 304C which the user 204 may interact with to select and/or activate respectively. Moreover, each of the selectable GUI items 302C may be characterized by one or more unique attributes, specifically, unique visual attributes, for example, a respective symbol.

As seen in FIG. 3F, assuming the user 204 may indicate a multi-selection to select a group of three selectable GUI items 302C from the six selectable GUI items 302C, for example, selectable GUI items 302C1, 302C4 and 302C6, which are indicated accordingly as selected by checking their associated check boxes. In such case the action GUI element 304C may be adjusted to aggregate the unique visual attributes, i.e., the symbols of all three selectable GUI items 302C1, 302C4 and 302C6.

Figure 3G:
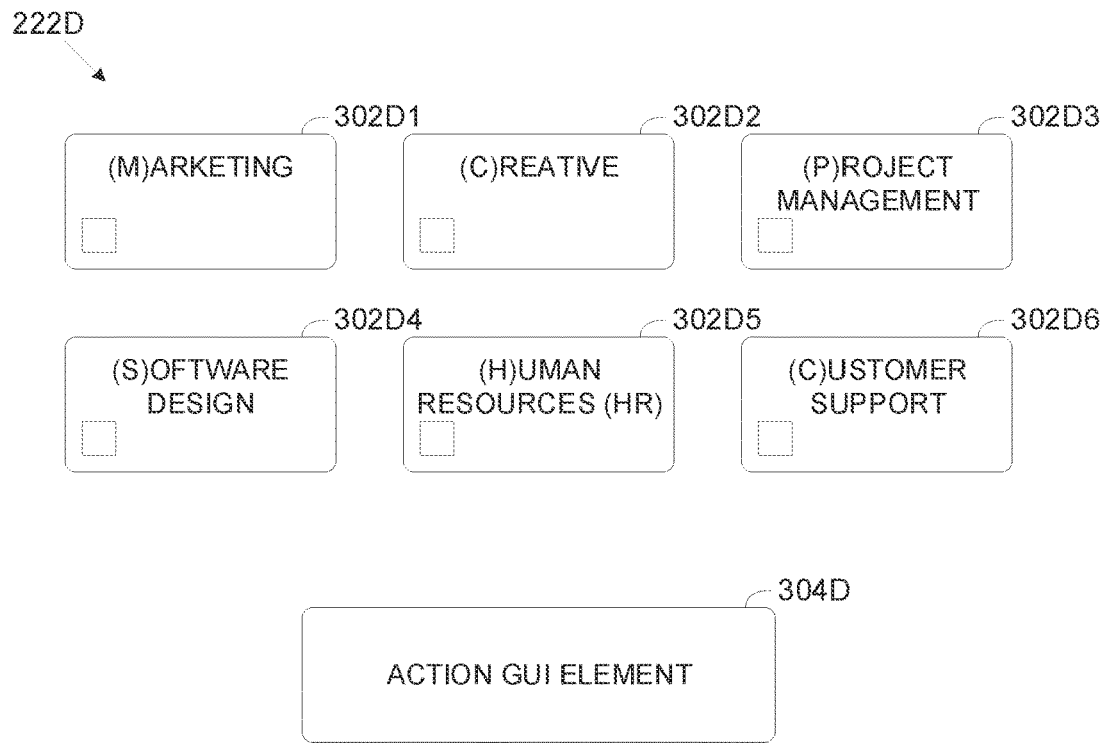
Figure 3H:
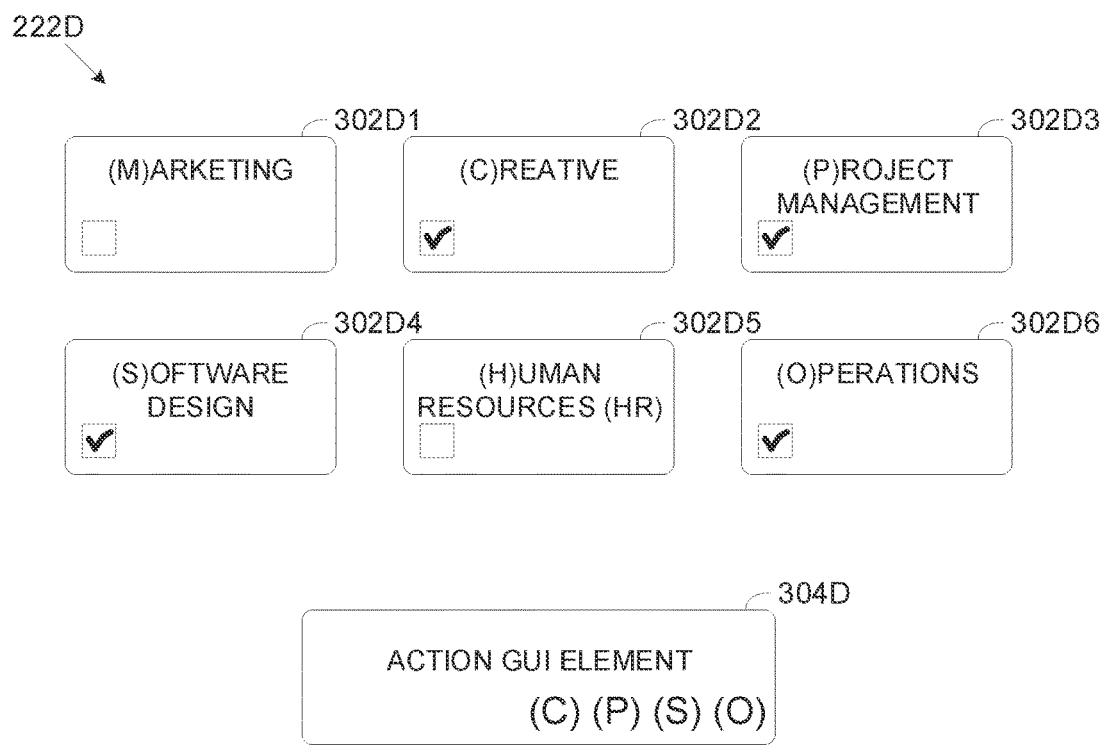
Figure 3I:
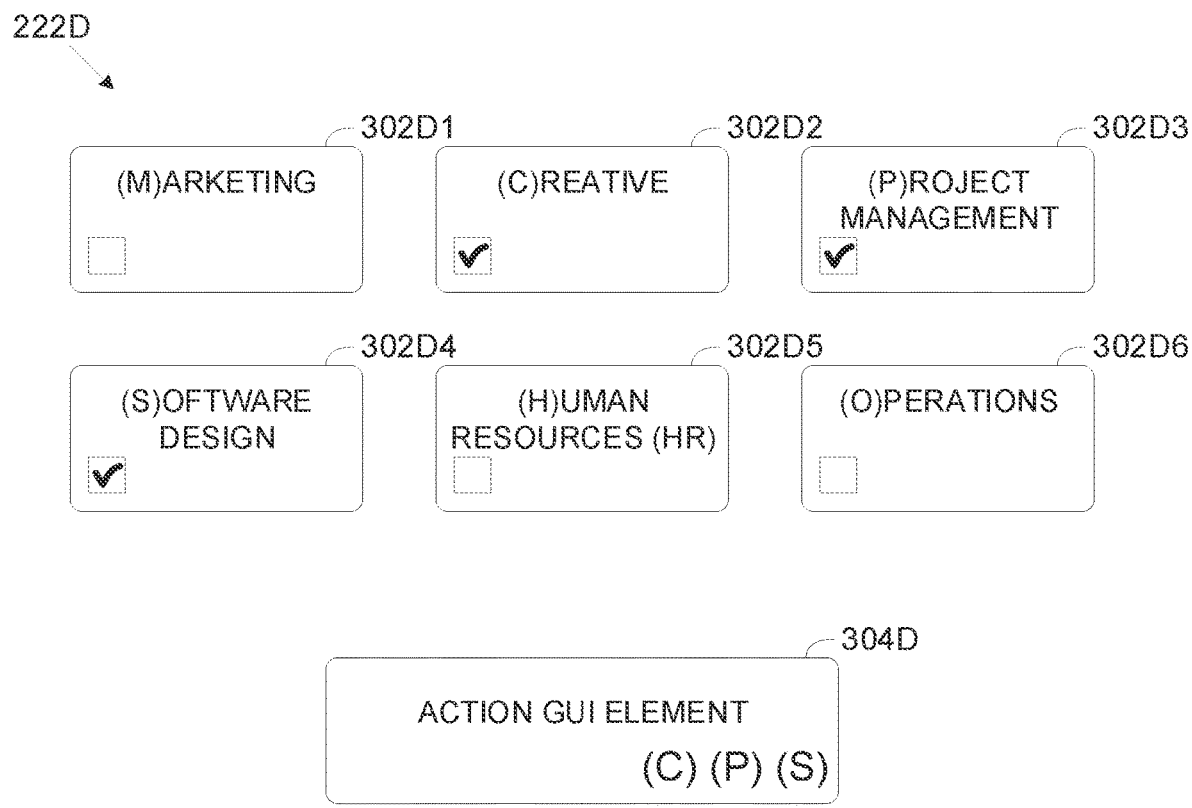

As seen in FIG. 3G, FIG. 3H and FIG. 3I, another exemplary GUI 222D such as the GUI 222 of an exemplary application such as the application 200 may comprise a plurality of GUI elements and items, for example, six selectable GUI items 302D, designated selectable GUI items 302D1 to 302D6, and one action GUI element 304D which the user 204 may interact with to select and/or activate respectively. Moreover, each of the selectable GUI items 302D may be characterized by one or more unique attributes, specifically, unique visual attributes, for example, an initial letter placed in parenthesis.

As seen in FIG. 3H, assuming the user 204 indicates a multi-selection to select a group of four selectable GUI items 302D from the six selectable GUI items 302D, for example, selectable GUI items 302D2, 302D3, 302D4 and 302D6, which are indicated accordingly as selected by checking their associated check boxes. In such case the action GUI element 304D may be adjusted to aggregate the unique visual attributes, i.e., the text, specifically the initial letters of all of the selected selectable GUI items 302D2, 302D3, 302D4 and 302D6.

As described herein before, the user 204 may de-select one or more of the selectable GUI items 302D which were previously selected and added to the group. In such case the action GUI element 304D may be adjusted accordingly to remove the unique visual attribute(s) of each de-selected selectable GUI item 302D. For example, assuming the user indicates de-selection of the selectable GUI item 302D6 which was indicated before as selected and thus part of the group. In such case, as seen in FIG. 3I, the action GUI element 304D may be visually adjusted to remove the unique visual attribute of the de-selected selectable GUI items 302D6, specifically remove the initial letter (O).

Reference is made once again to FIG. 1.

As shown in 110, user input indicative of activation of one or more of the action GUI elements may be provided by the user 140 and received, for example, by the application 220.

As described herein before with respect to the selectable GUI items, the user 204 may activate the action GUI elements via one or more of the HMIs provided by the user interface 216, for example, clicking (on) the respective action GUI element using a pointing device, hovering with a pointing device over the respective action GUI element, touching the respective action GUI element in a touchscreen, and/or the like.

As shown at 112, the application 220 may initiate one or more actions in response to activation of the one or more of the action GUI element(s).

The action(s) initiated in response to activation of the action GUI element(s) may be initiated immediately, shortly after and/or in a scheduled time following the activation of the action GUI element(s). The exact timing of initiation of the action(s) may depend on one or more parameters, settings and/or characteristics of the action(s), the application, and/or the like which are beyond the scope of this disclosure.

Specifically, since the action GUI element may reflect multi-selection of a plurality of selectable GUI items, one or more of the initiated actions may be adjusted according to all of the selectable GUI items of the group.

For example, assuming the group of selected selectable GUI items of a certain GUI 222 as indicated by a certain activated action GUI element of the certain GUI 222 comprises three selectable GUI items each comprising a link to a respective webpage. In such case, responsive to the activation of the certain action GUI element, the application 220 may launch one or more web browsers configured to render the three webpages.

In another example, assuming the group of selected selectable GUI items of a certain GUI 222 as indicated by a certain activated action GUI element of the certain GUI 222 comprises four selectable GUI items each indicating a personal information record of a respective employee. In such case, responsive to the activation of the certain action GUI element, the application 220 may retrieve the personal information records of the four employees and display them on the display of the client device 202.

In another example, assuming the group of selected selectable GUI items of a certain GUI 222 as indicated by a certain activated action GUI element of the certain GUI 222 comprises two selectable GUI items each linked to a respective application. In such case, responsive to the activation of the certain action GUI element, the application 220 may launce the two applications.

According to some embodiments of the present invention, one or more of the actions initiated by activating one or more of the action GUI elements of the GUI 222 may involve and/or comprise initiation of one or more visual elements (GUI element), for example, a window, a menu, a symbol, an icon, and/or the like.

Moreover, one or more of the actions may involve and/or comprise initiation of a plurality of visual elements each with respect to a respective one of the selectable GUI items of the group selected by the user 204. As such, each visual element (GUI element) may correspond to a respective one of the selected selectable GUI items of the group.

For example, in response to activation of a certain action GUI element, the application 220 may create a plurality of windows each corresponding to a respective one of the selected selectable GUI items of the group. In another example, in in response to activation of a certain action GUI element, the application 220 may create a plurality of symbols each corresponding to a respective one of the selected selectable GUI items of the group. In another example, in response to activation of a certain action GUI element, the application 220 may create a plurality of menus each corresponding to a respective one of the selected selectable GUI items of the group. In another example, in response to activation of a certain action GUI element, the application 220 may create a plurality of icons each corresponding to a respective one of the selected selectable GUI items of the group.

The visual elements created and/or launched in response to activating the action GUI element according to the group of selected selectable GUI items may be of the same type. For example, assuming the group comprises three selectable GUI items indicated and selected by the user 204. In response to activating the action GUI element, the application may initiate three visual elements of the same type. For example, three window corresponding to a first selectable GUI item, a second selectable GUI item, and a third selectable GUI item of the group.

However, the visual elements created and/or launched in response to activating the action GUI element according to the group of selected selectable GUI items may be different from each other. For example, assuming the group comprises three selectable GUI items indicated and selected by the user 204. In response to activating the action GUI element, the application may initiate a first type of visual element, for example, a window corresponding to a first selectable GUI item of the group, a second type of visual element, for example, a menu corresponding to a second selectable GUI item of the group, and a third type of visual element, for example, an icon corresponding to a third selectable GUI item of the group.

In order to maintain a link between each selected selectable GUI item of the group and its corresponding next stage visual element presented to the user 204 via the GUI, one or more of the visual elements created and/or lunched in response to activation of the action GUI element according to the selectable GUI item of the group selected by the user 204 may be also characterized by one or more of the unique attributes of their corresponding selectable GUI item of the group, for example, a unique visual attribute, a unique audible attribute and/or a combination thereof.

This means that one or more of the unique attribute(s) of a certain selected selectable GUI item(s) may be carried on in subsequent GUI screens to maintain a coherent, consistent and systematic connection between the selected selectable GUI items and their corresponding visual elements presented later on.

For example, assuming that in response to activation of the action GUI element the application 220 adjusts the GUI 222 to present a respective window for each selectable GUI item of the group selected by the user 204. In such case, each window may comprise and/or be associated with one or more of the unique attribute(s) of its corresponding selectable GUI item, for example, a unique visual attribute, a unique audible attribute and/or a combination thereof.

Reference is now made to FIG. 4A, FIG. 4B, FIG. 4C and FIG. 4D, which are schematic illustrations of exemplary visual elements initiated in response to multi-selection of selectable GUI items which are characterized by unique visual attributes of the selected selectable GUI items, according to some embodiments of the present invention.

FIG. 4A, FIG. 4B, FIG. 4C, and FIG. 4D portray exemplary GUIs such as the GUI 222 of one or more exemplary applications such as the application 200 executed by one or more client devices such as the client device 202 used by one or more users such as the user 204 may be presented on the screen (display) of the client device(s) 202. In particular, the FIG. 4A, FIG. 4B, FIG. 4C, and FIG. 4D show exemplary visual elements initiated and displayed on the screen of the client device 202 in response to activation of an action GUI element of the GUI 222. Specifically, the visual elements initiated are initiated according to the selectable GUI items of the group selected by the user 204 and may be also characterized by one or more of the unique attributes of their corresponding selectable GUI item of the group, for example, a unique visual attribute.

As seen in FIG. 4A, in a first exemplary embodiment continuing the example presented in FIG. 3B, assuming that in response to the activation of the action GUI element, two visual elements, for example, two windows are crated, a first window 402A1 corresponding to the selectable GUI item 302A3 and a second window 402A2 corresponding to the selectable GUI item 302A5.

In such case, each of the visual elements 402A may be characterized by one or more of the unique visual attribute(s) of a corresponding selectable GUI item 302A, for example, the visual element 402A1 may comprise a header having the color of the selectable GUI item 302A3. Similarly, the visual element 402A2 may be characterized by one or more of the unique visual attribute(s) of the selectable GUI item 302A5, for example, the visual element 2 may comprise a header having the color of the selectable GUI item 302A5.

As seen in FIG. 4B, in another exemplary embodiment, continuing the example presented in FIG. 3D, assuming that in response to the activation of the action GUI element, three visual elements, for example, three windows are crated, a first window 402B1 corresponding to the selectable GUI item 302B1, a second window 402B2 corresponding to the selectable GUI item 302B3 and a third window 402B3 corresponding to the selectable GUI item 302B6.

In such case, each of the visual elements 402B may be characterized by one or more of the unique visual attribute(s) of a corresponding selectable GUI item 302B, for example, the visual element 302B1 may comprise a border section having the texture of the selectable GUI item 302B1. Similarly, the visual element 402B2 may be characterized by one or more of the unique visual attribute(s) of the selectable GUI item 302B3, for example, comprise a border section having the texture of the selectable GUI item 302B3 and the visual element 402B3 may be characterized by one or more of the unique visual attribute(s) of the selectable GUI item 302B6, for example, comprise a border section having the texture of the selectable GUI item 302B6.

As seen in FIG. 4C, in another exemplary embodiment, continuing the example presented in FIG. 3F, assuming that in response to the activation of the action GUI element, three visual elements, for example, three windows are crated, a first window 402C1 corresponding to the selectable GUI item 302C1, a second window 402C2 corresponding to the selectable GUI item 302C4 and a third window 402C3 corresponding to the selectable GUI item 302C6.

In such case, each of the visual elements 402C may be characterized by one or more of the unique visual attribute(s) of a corresponding selectable GUI item 302C, for example, the visual element 402C1 may comprise a top bar constructed of the symbols of the selectable GUI item 302C1. Similarly, the visual element 402C2 may be characterized by one or more of the unique visual attribute(s) of the selectable GUI item 302C4, for example, comprise a top bar constructed of the symbols of the selectable GUI item 302C4 and the visual element 402C3 may be characterized by one or more of the unique visual attribute(s) of the selectable GUI item 302C6, for example, comprise a top bar constructed of the symbols of the selectable GUI item 302C6.

As seen in FIG. 4D, in another exemplary embodiment, continuing the example presented in FIG. 3H, assuming that in response to the activation of the action GUI element, four visual elements, for example, four windows are crated, a first window 402D1 corresponding to the selectable GUI item 302D2, a second window 402D2 corresponding to the selectable GUI item 302D3, a third window 402D3 corresponding to the selectable GUI item 302D4 and a fourth window 402D4 corresponding to the selectable GUI item 302D6.

In such case, each of the visual elements 402D may be characterized by one or more of the unique visual attribute(s) of a corresponding selectable GUI item 302D, for example, the text "(M)ARKETING" with the letter "M" in parenthesis. The visual element 402D2 may be characterized by the unique visual attribute(s) of the selectable GUI item 302D3, for example, the text "(P)ROJECT MANAGEMENT" with the letter "P" in parenthesis. The visual element 402D3 may be characterized by the unique visual attribute(s) of the selectable GUI item 302D4, for example, the text "(S)OFTWARE DESIGN" with the letter "S" in parenthesis. And the visual element 402D4 may be characterized by the unique visual attribute(s) of the selectable GUI item 302D6, for example, the text "(O)PERATIONS" with the initial letter "O" in parenthesis As stated herein before, GUIs such as the GUI 222 comprising a plurality of selectable GUI items and action GUI elements adjustable to visually reflect multi-selection of a plurality of selectable GUI items may be applied for a plurality of applications 220, for example, an application having GUI to support dashboard GUI to enable a user such as the user 204 to a monitor and/or control functionality of the management application, a shopping service having a GUI to support a shopping cart, and/or the like.

Reference is now made to FIG. 5A and FIG. 5B, which are schematic illustrations of an exemplary dashboard GUI of an exemplary workflow management application supporting multi-selection of selectable GUI items presented on a screen, according to some embodiments of the present invention.

As seen in FIG. 5A, an exemplary workflow management application such as the application 220 may be configured to interact with users such as the user 204 via an exemplary dashboard GUI 2221 such as the GUI 222 which may comprise a plurality of selectable GUI items 302E such as the selectable GUI item 302, for example, selectable GUI items 302E1 through 302E9.

Each of the selectable GUI items 302E1, 302E2, 302E3, 302E4, 302E5, 302E6, 302E7, 302E8 and 302E9 may be associated with a respective professional domain, for example, Creative & design, IT, Software Development, Marketing, Project Management, Sales & CRM, Task Management, HR, and Operations.

Moreover, each of the selectable GUI items 302E1 through 302E9 may be characterized by a unique visual attribute, for example, a unique color. Each of the selectable GUI items may further comprise an associated checkbox indicating whether the respective selectable GUI item is selected or not.

The GUI 2221 may further include one or more exemplary action GUI elements such as the action GUI element 304, for example, a "Get started" action GUI element 304E configured to trigger the workflow management application 220 to initiate one or more respective workflows for each selected selectable GUI item 302E, specifically create a workflow for the domain associated with each selected selectable GUI item 302E.

As seen in FIG. 5A, the visual appearance of the "Get started" action GUI element 304E is initially neutral and/or non-indicative of any selection. However, the "Get started" action GUI element 304E may be adjusted to according to user selection of the selectable GUI item 302E, and moreover according to multi-selection of a group of multiple selectable GUI items 302E by the user 204 such that the "Get started" action GUI element 304E reflects the selection of the group of multiple selectable GUI items 302E selected by the user 204.

In particular, the "Get started" action GUI element 304E may be dynamically adjusted to append the visual attributes (colors) unique to each of the selected selectable GUI items thus aggregating the unique visual attributes of all of the selected selectable GUI items of the group and reflecting their selection.

As seen in FIG. 5B, in response to indications of selection of a group of the selectable GUI items 302E by the user 204, for example, Creative & design 302E1, Software Development 302E3, and Task Management 302E7, the "Get started" action GUI 304E element may be dynamically adjusted to include the colors of the selectable GUI items 302E of the selected group. In particular, the "Get started" action GUI element may be adjusted by appending the color of each selected selectable GUI item 302E such that the "Get started" action GUI element aggregates the colors of all of the selectable GUI items of the group.

Following the selection, the user 204 may further interact with the Get started" action GUI element 304E to trigger the workflow management application to initiate one or more of the actions according to all of the selectable GUI items 302E of the selected group. For example, in response to activating the "Get started" action GUI element 304E, the workflow management application may initiate a plurality of visual elements, for example multiple workflow windows each corresponding to one of the domains (selectable GUI items) selected by the user.

Optionally, one or more of the workflow windows are constructed by the GUI 2221 to include one or more of the unique visual attributes, for example, the color of the corresponding domain selectable GUI item(s) 302E selected by the user 204.

In another example, one or more shopping applications and/or online services such as the application 220 may be configured to interact with one or more users such as the user 204 via a shopping GUI such as the GUI 222 which may comprise a plurality of selectable GUI items such as the selectable GUI items 302, for example, purchase items offered for sale each characterized by a unique visual attribute. The shipping GUI may further include one or more action GUI elements such as the action GUI element 304, for example, a shopping cart action GUI element in which the user 204 may select and place a group of multiple selectable GUI purchase items and activate the one or more action GUI elements configured to trigger the application to initiate one or more actions according to all of the selectable GUI items of the selected group.

A user 204 using the shopping application may browse through a plurality of selectable GUI purchase items. In response to indication of selection of each selectable GUI purchase item by the user 204 and adding it to the shopping cart action GUI element, an icon of the action GUI element may be dynamically adjusted to reflect the selection of the respective selectable GUI purchase item by appending the unique visual attributes of the respective added item to the shopping cart icon such that the shopping cart icon aggregates the unique visual attributes of all the purchase items added by the user 204 to the shopping cart.

For example, assuming the user 204 browsing in the online shopping service selects a certain shirt in a plurality of different colors (selectable GUI items). In such case, in response to the selection of each shirt (selectable GUI item), the shopping cart icon (action GUI element) and/or a shirt symbol in the shopping cart may be dynamically adjusted by appending the color of the selected shirt to the shopping cart icon and/or the shirt symbol such that the shopping cart icon and/or the shirt symbol may aggregate all the colors of all of the plurality of selected shirts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms GUI, GUI element, GUI item, and selectable GUI items are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of adjusting elements of a Graphical User Interface (GUI) to reflect multi-selection of GUI items, comprising:
    presenting a plurality of selectable GUI items and at least one action GUI element configured to initiate at least one action adjusted according to a multi-selection of at least some of the plurality of selectable GUI items, wherein each of the plurality of selectable GUI items is characterized by at least one unique attribute;
    analyzing user input to detect a plurality of indications sequentially indicated by a user to select a group of selectable GUI items from the plurality of selectable GUI items; and
    responsive to detection of each of the plurality of indications, visually marking the respective selectable GUI item selected in the respective indication and appending the at least one unique attribute of the respective selectable GUI item selected in the respective indication to the at least one action GUI element such that the at least one action GUI element is dynamically adjusted to aggregate the at least one unique attribute of all of the selectable GUI items of the group;
    wherein the aggregation of the at least one unique attribute of all of the selectable GUI items of the group comprises at least one additional unique attribute in addition to the at least one unique attribute appended thereto;
    wherein each of the plurality of selectable GUI items remains at a fixed location prior to and after the visually marking,
    wherein each of the plurality of selectable GUI items represents a respective one of a plurality of workflows and the at least one action GUI element is configured to initiate a dashboard in the GUI which comprises a plurality of boards each for managing a respective one of the plurality of workflows associated with each selected selectable GUI item of the group.

2. The computer implemented method of claim 1, wherein responsive to detection of deselection of at least one selectable GUI item of the group, the at least one unique attribute of the at least one deselected selectable GUI item is removed from the at least one action GUI element.

3. The computer implemented method of claim 1, wherein the at least one action GUI element is dynamically adjusted to aggregate the at least one unique attribute of all of the selectable GUI items of the group in an order reflecting at least one of: an order of selection of the selectable GUI items of the group, and a location of each of the selectable GUI items of the group with respect to the at least one action GUI element.

4. The computer implemented method of claim 1, wherein each of the plurality of selectable GUI items is selectable by at least one of: clicking the respective selectable GUI item, hovering over the respective selectable GUI item, and touching the respective selectable GUI item.

5. The computer implemented method of claim 1, wherein each of the plurality of selectable GUI items is selectable by dragging the respective selectable GUI item and dropping the respective selectable GUI item over the at least one action GUI element.

6. The computer implemented method of claim 1, wherein the aggregation occurs within boundaries of the at least one action GUI element.

7. The computer implemented method of claim 1, wherein the at least one action GUI element has a stationary position which maintains a fixed respective distance from each of the plurality of selectable GUI items.

8. The computer implemented method of claim 1 further comprising configuring said at least one action GUI element to be adjusted by assigning to said at least one action GUI element a first action associated with a first selectable GUI item selected by a first indication of the plurality of indications upon a detection of said first indication, and when additional indications of the plurality of indications are detected, configuring said at least one action GUI element to be adjusted by appending an action associated with each additional indication of a respective selectable GUI item selected in the respective indication;
    wherein when activated, said at least one action GUI element initiates actions according to said configuring.

9. The computer implemented method of claim 1, wherein, in response to indication of selection of each of the plurality of selectable GUI items, the respective selected selectable GUI item is visually adjusted to indicate it is selected.

10. The computer implemented method of claim 9, wherein the respective selected selectable GUI item is visually adjusted by applying at least one visual effect to the respective selected selectable GUI item, the at least one visual effect is a member of a group consisting of: checking a checkbox associated with the respective selected selectable GUI item, highlighting the respective selected selectable GUI item, creating a background for the respective selected selectable GUI item, creating a shadow for the respective selected selectable GUI item, modifying a brightness of the respective selected selectable GUI item, and modifying a hue of the respective selected selectable GUI item.

11. The computer implemented method of claim 1, wherein the at least one action initiated in response to activation of the at least one action GUI element comprises initiating a respective one of a plurality of visual elements in the GUI for each selected selectable GUI item of the group.

12. The computer implemented method of claim 11, wherein each of the plurality of visual elements is characterized by the at least one unique attribute of the respective selected selectable GUI item.

13. The computer implemented method of claim 1, wherein the at least one unique attribute is a member of a group consisting of: at least one unique visual attribute, at least one unique audible attribute and a combination thereof.

14. The computer implemented method of claim 13, wherein the at least one unique visual attribute is a member of a group consisting of: a color, a texture, a symbol, an icon, a shape, and a text.

15. The computer implemented method of claim 13, wherein the at least one unique audible attribute is a member of a group consisting of: a tone, a sound, and a musical note.

16. The computer implemented method of claim 13, further comprising associating the at least one action GUI element with an audio sequence generated based on the at least one unique audible attribute of all of the selectable GUI items of the group.

17. The computer implemented method of claim 16, further comprising using at least one machine learning model to generate the audio sequence based on the at least one unique audible attribute of all of the selectable GUI items of the group.

18. The computer implemented method of claim 13, further comprising associating the at least one action GUI element with an animation generated based on the at least one unique visual attribute of all of the selectable GUI items of the group.

19. The computer implemented method of claim 18, further comprising using at least one machine learning model to generate the animation based on the at least one unique visual attribute of all of the selectable GUI items of the group.

20. The computer implemented method of claim 18, further comprising adjusting at least one visual parameter of the at least one action GUI element to enhance its presentation when adjusted to aggregate the at least one unique visual attribute of all of the selectable GUI items of the group.

21. A system for adjusting elements of a Graphical User Interface (GUI) to reflect multi-selection of GUI items, comprising:
   at least one processor configured to execute a code, the code comprising:
      code instructions to present a plurality of selectable GUI items and at least one action GUI element configured to initiate at least one action adjusted according to a multi-selection of at least some of the plurality of selectable GUI items, wherein each of the plurality of selectable GUI items is characterized by at least one unique attribute;
      code instructions to analyze user input to detect a plurality of indications sequentially indicated by a user to select a group of selectable GUI items from the plurality of selectable GUI items;
      code instructions to visually mark, responsive to detection of each of the plurality of indications, a respective selectable GUI item selected in the respective indication; and
      code instructions to append, responsive to said detection of each of the plurality of indications, the at least one unique attribute of the respective selectable GUI item selected in the respective indication to the at least one action GUI element such that the at least one action GUI element is dynamically adjusted to aggregate the at least one unique attribute of all of the selectable GUI items of the group;
   wherein the aggregation of the at least one unique attribute of all of the selectable GUI items of the group comprises at least one additional unique attribute in addition to the at least one unique attribute appended thereto;
   wherein each of the plurality of selectable GUI items remains at a fixed location prior to and after the visually marking;
   wherein each of the plurality of selectable GUI items represents a respective one of a plurality of workflows and the at least one action GUI element is configured to initiate a dashboard in the GUI which comprises a plurality of boards each for managing a respective one of the plurality of workflows associated with each selected selectable GUI item of the group.

22. A computer implemented method of adjusting elements of a Graphical User Interface (GUI) to reflect multi-selection of GUI items, comprising:
   presenting a plurality of selectable GUI items and at least one action GUI element configured to initiate at least one action adjusted according to a multi-selection of at least some of the plurality of selectable GUI items, wherein each of the plurality of selectable GUI items is characterized by at least one unique attribute;
   analyzing user input to detect a plurality of indications sequentially indicated by a user to select a group of selectable GUI items from the plurality of selectable GUI items;
   responsive to detection of each of the plurality of indications, visually marking the respective selectable GUI item selected in the respective indication and appending the at least one unique attribute of the respective selectable GUI item selected in the respective indication to the at least one action GUI element such that the at least one action GUI element is dynamically adjusted to aggregate the at least one unique attribute of all of the selectable GUI items of the group; and
   responsive to activation of the at least one action GUI element, initiate the at least one action adjusted according to all of the selectable GUI items of the group;
   wherein the aggregation of the at least one unique attribute of all of the selectable GUI items of the group comprises at least one additional unique attribute in addition to the at least one unique attribute appended thereto;
   wherein each of the plurality of selectable GUI items remains at a fixed location prior to and after the visually marking;
   wherein each of the plurality of selectable GUI items represents a respective one of a plurality of workflows and the at least one action GUI element is configured to initiate a dashboard in the GUI which comprises a plurality of boards each for managing a respective one of the plurality of workflows associated with each selected selectable GUI item of the group.

\* \* \* \* \*